United States Patent
Dessau

(10) Patent No.: US 9,405,822 B2
(45) Date of Patent: Aug. 2, 2016

(54) QUERIES OF A TOPIC-BASED-SOURCE-SPECIFIC SEARCH SYSTEM

(71) Applicant: Sheer Data, LLC, New York, NY (US)

(72) Inventor: Robert M. Dessau, New York, NY (US)

(73) Assignee: Sheer Data, LLC, New York, NY (US)

( * ) Notice: Subject to any disclaimer, the term of this patent is extended or adjusted under 35 U.S.C. 154(b) by 583 days.

(21) Appl. No.: 13/911,565

(22) Filed: Jun. 6, 2013

(65) Prior Publication Data

US 2014/0365467 A1 Dec. 11, 2014

(51) Int. Cl.
*G06F 17/30* (2006.01)

(52) U.S. Cl.
CPC ...... *G06F 17/3064* (2013.01); *G06F 17/30336* (2013.01); *G06F 17/30554* (2013.01)

(58) Field of Classification Search
CPC .......... G06F 17/30864; G06F 17/3064; G06F 17/30336; G06F 17/30554; G06F 17/30; G08B 21/245; G06Q 10/10; G06Q 30/0256; G06Q 30/0244; G06Q 30/0267; G06Q 30/0269; G06Q 30/0277; G06Q 30/0261; G06Q 30/02; G06Q 30/0283; G06Q 10/06
See application file for complete search history.

(56) References Cited

U.S. PATENT DOCUMENTS

| | | | | |
|---|---|---|---|---|
| 6,460,029 B1 * | 10/2002 | Fries | ................. | G06F 17/30654 707/E17.068 |
| 6,594,654 B1 * | 7/2003 | Salam | ............... | G06F 17/30861 707/E17.107 |
| 6,751,606 B1 * | 6/2004 | Fries | ................. | G06F 17/30864 707/E17.108 |
| RE44,794 E * | 3/2014 | Stephens, Jr. | ..... | G06F 17/30696 707/722 |
| 8,990,352 B1 * | 3/2015 | Kosslyn | ............ | G06F 17/30041 709/219 |

(Continued)

FOREIGN PATENT DOCUMENTS

WO 2014197663 12/2014

OTHER PUBLICATIONS

Ruihai Dong, Markus Schaal, Michael P. O'Mahony, Kevin McCarthy, and Barry Smyth—"Harnessing the Experience Web to Support User-Generated Product Reviews" Case-Based Reasoning Research and Development vol. 7466 of the series Lecture Notes in Computer Science 20th International Conference, ICCBR 2012, Lyon, France, Sep. 3-6, 2012 pp. 62-76.*

(Continued)

*Primary Examiner* — Anh Ly
(74) *Attorney, Agent, or Firm* — Sheppard Mullin Richter & Hampton LLP

(57) ABSTRACT

Approaches for facilitating queries of a topic-based-source-specific search system are disclosed. In certain implementations, an input relating to a query may be received. Suggested ones of predefined sources and suggested ones of information items of the predefined sources may be determined based on the input. A set of suggestions including a group of suggestions relating to the suggested sources and a group of suggestions relating to the suggested information items may be provided for presentation on a user interface. In some implementations, metadata that indicates first, second, or other attributes relating to the predefined sources or the information items may be stored in association with the predefined sources or the information items. A second input relating to the query may be received responsive to providing the set of suggestions. A presentation of a comparison between the first attribute and the second attribute may be provided based on the second input.

25 Claims, 16 Drawing Sheets

(56) References Cited

U.S. PATENT DOCUMENTS

| | | | | |
|---|---|---|---|---|
| 2002/0032677 | A1* | 3/2002 | Morgenthaler | G06F 17/30781 707/E17.108 |
| 2005/0149496 | A1* | 7/2005 | Mukherjee | G06F 17/30528 707/E17.032 |
| 2006/0004814 | A1* | 1/2006 | Lawrence | G06Q 40/08 707/E17.014 |
| 2006/0004866 | A1* | 1/2006 | Lawrence | G06F 17/30011 707/E17.008 |
| 2006/0184566 | A1* | 8/2006 | Lo | G06F 17/30038 707/E17.009 |
| 2006/0274767 | A1* | 12/2006 | Dessau | G06F 17/3089 707/E17.111 |
| 2007/0244900 | A1 | 10/2007 | Hopkins | |
| 2008/0140621 | A1* | 6/2008 | Martinez | G06F 17/30867 707/E17.117 |
| 2008/0243825 | A1* | 10/2008 | Staddon | G06F 17/30637 707/E17.062 |
| 2008/0244644 | A1* | 10/2008 | McCausland | G11B 27/34 725/37 |
| 2008/0300935 | A1* | 12/2008 | Musier | G06Q 10/063 705/7.11 |
| 2010/0076979 | A1* | 3/2010 | Wang | G06F 17/30864 707/740 |
| 2011/0161311 | A1* | 6/2011 | Mishne | G06F 17/30864 707/719 |
| 2011/0282752 | A1* | 11/2011 | Manriquez | G06Q 30/0277 705/14.73 |
| 2012/0233253 | A1 | 9/2012 | Ricci | |
| 2012/0311465 | A1* | 12/2012 | Nealer | H04L 29/06 715/760 |
| 2012/0331420 | A1 | 12/2012 | Meyer | |
| 2013/0159333 | A1* | 6/2013 | Assam | G06F 17/30386 707/758 |
| 2014/0059452 | A1* | 2/2014 | Kao | H04L 65/403 715/753 |

OTHER PUBLICATIONS

Milad Shokouhi—"Learning to Personalize Query Auto-Completion" Proceeding SIGIR '13 Proceedings of the 36th international ACM SIGIR conference on Research and development in information retrieval—pp. 103-112.*

* cited by examiner

Keywords: Keyword Set 1, Keyword Set2, Keyword Set 3, ...

Figures: Figure 1, Figure 2, Figure 3, ...

Organizations: Organization 1, Organization 2, Organization 3, ...

Places: Region 1, Region 2, Region 3, ...

Date

☐     Time Range 1     (1000)
☐     Time Range 2     (3000)
☐     Time Range 3     (5000)

Party Affiliation

☐     Party 1     (1000)
☐     Party 2     (2000)
☐     Party 3     (3000)

State Delegation

☐     State 1     (1000)
☐     State 2     (2000)
☐     State 3     (3000)

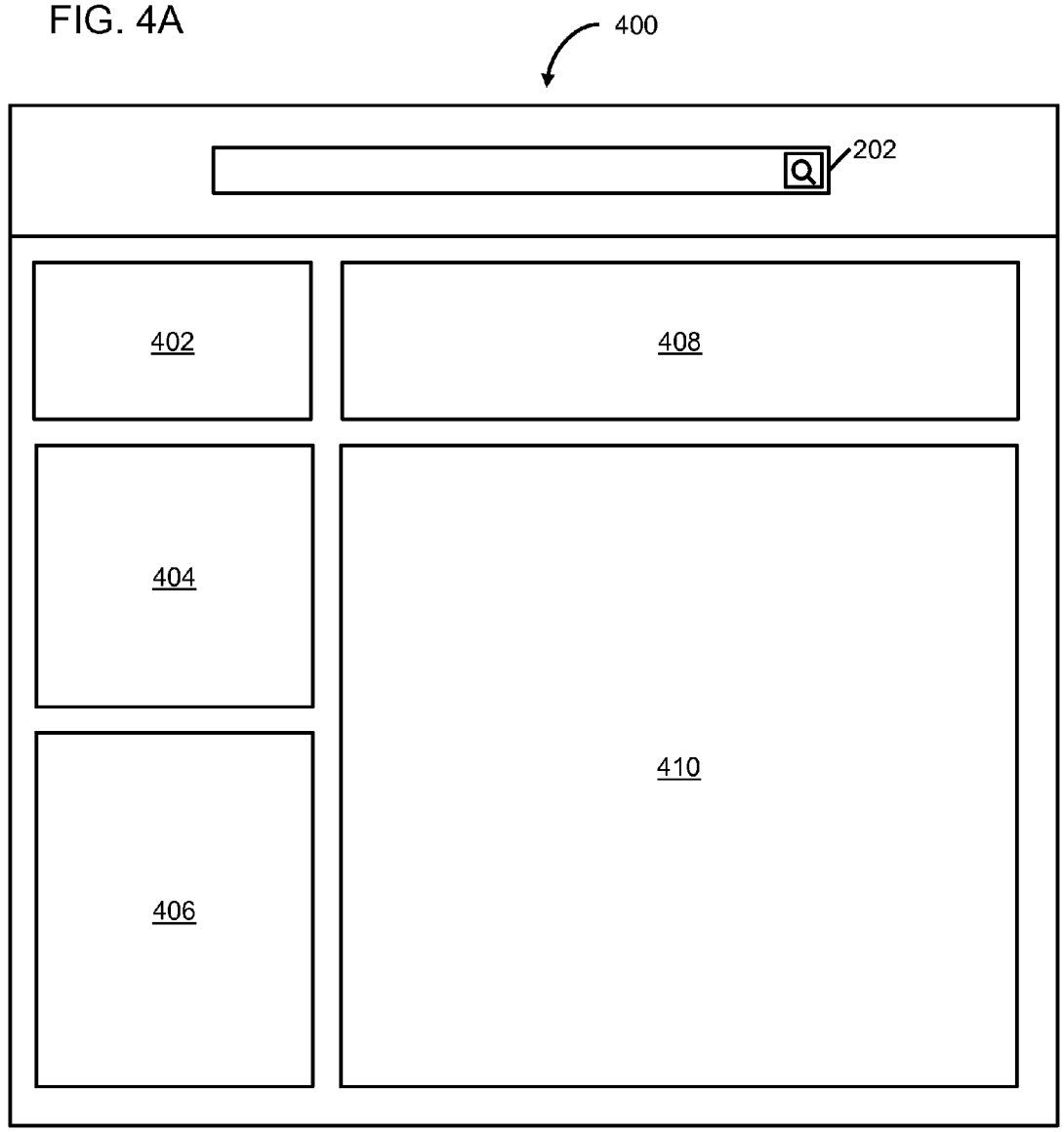

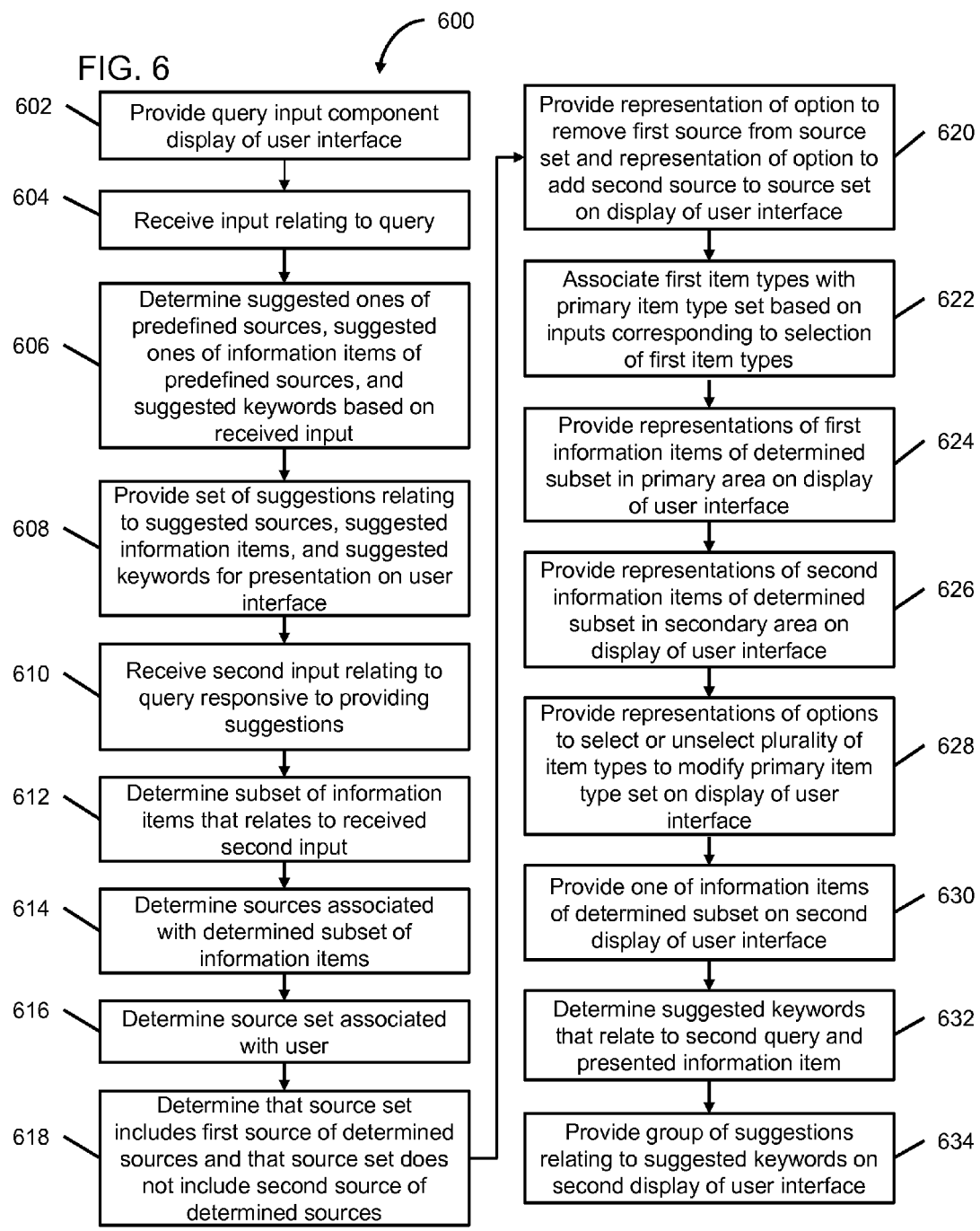

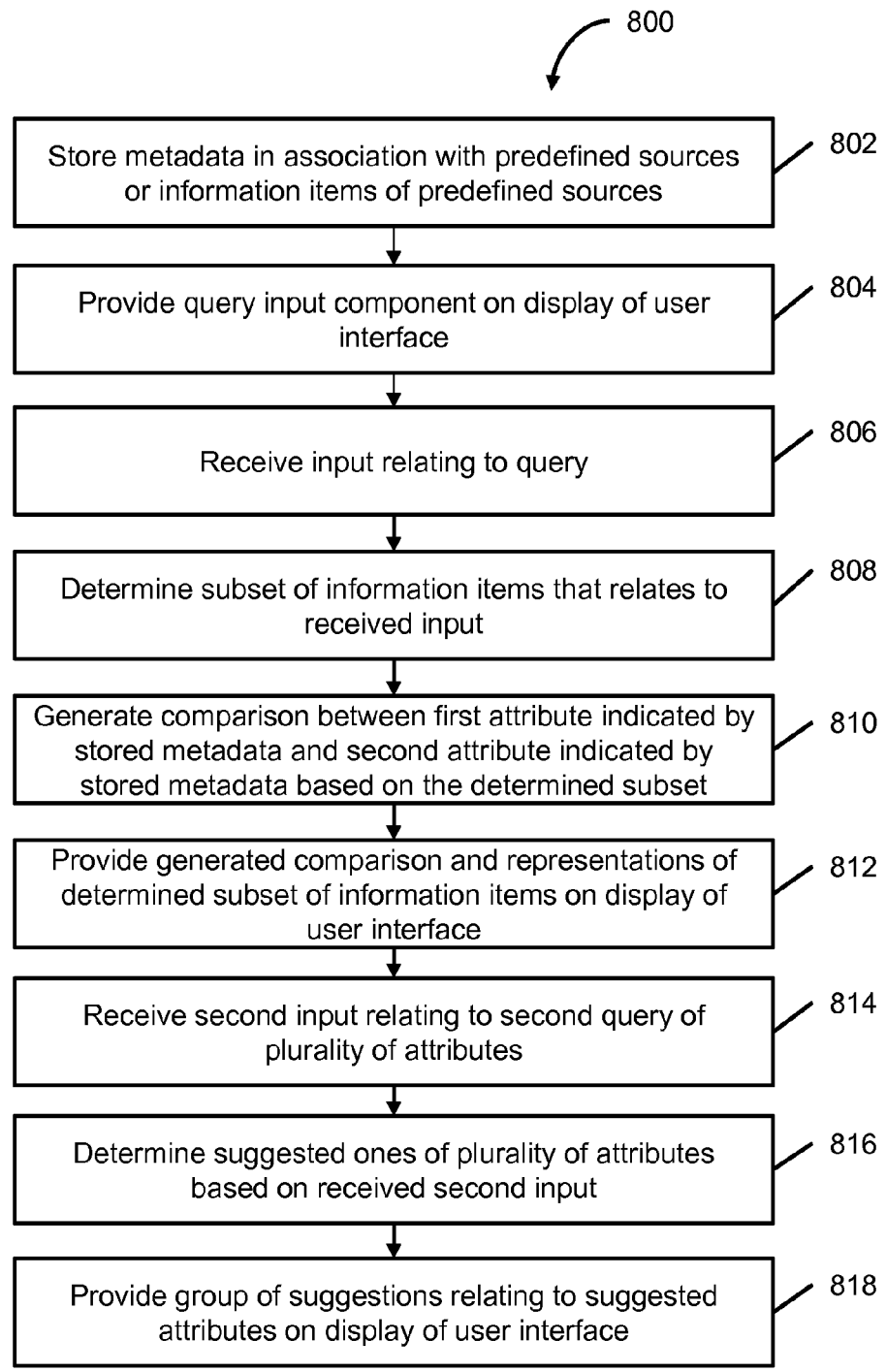

QUERIES OF A TOPIC-BASED-SOURCE-SPECIFIC SEARCH SYSTEM

FIELD OF THE INVENTION

The invention relates generally to queries of a topic-based-source-specific search system, including, among other aspects, simultaneous presentation of suggestions (e.g., suggested sources, suggested information items, suggested keywords, or other suggestions), comparisons relating to queries, multiple result sets based on different filters, multiple options to modify an associated source set, or other features based on queries of a topic-based-source-specific search system.

BACKGROUND OF THE INVENTION

Numerous disparate sources of government information exist. These sources include government websites, intergovernmental agency websites, news websites, and other sources. One problem with existing systems and methods for accessing this information is the need to find and repeatedly visit numerous sites to stay abreast of the desired information. These and other drawbacks exists.

SUMMARY OF THE INVENTION

The invention addressing these and other drawbacks relates to methods, apparatuses, and/or systems for facilitating queries of a topic-based-source-specific search system. In exemplary implementations, a plurality of predefined sources of government information may be pre-selected for the topic-based-source-specific search system. The predefined sources and information items of the predefined sources may be processed. Metadata indicating various attributes of the predefined sources or the information items may be stored in association with the predefined sources or the information items. The search system, user interfaces of the search system, or other components of the search system may be configured to provide: (i) discovery and following of sources of the predefined sources; (ii) viewing of information items from the followed sources, query results, or other information in an organized manner; (iii) comparisons of attributes associated with the predefined sources or the information items; (iv) or other benefits.

A system for facilitating queries of a topic-based-source-specific search system may comprise one or more servers (or other components) that include one or more processors configured to execute one or more computer program modules. The computer program modules may include a query input module, a suggestion module, a user interface module, an information retrieval module, an indexing module, a user profile module, a comparison module, or other modules.

In certain implementations, the topic-based-search-specific search system may be configured to collect information from predefined sources relating to a content topic prior to queries of the topic-based-search-specific search system. In some implementations, the content topic may correspond to government information or other type of information.

The query input module may be configured to receive an input relating to a query. In one scenario, the received input may correspond to a portion of a query that a user has not yet submitted or otherwise completed. The received input may, for instance, represent at least a portion of a query that the user may submit. In another scenario, the received input may correspond to a complete query.

The suggestion module may be configured to determine suggested ones of the predefined sources, suggested ones of information items of the predefined sources, one or more suggested keywords, or other suggestions based on the received input. In certain implementations, the information items of the predefined sources may relate to press releases, speeches, opinions, statements, legislations, or other government information. Formats of the information items may correspond to one or more of textual formats, image formats, audio formats, video formats, or other formats. In some implementations, the suggested information items may relate to bills, laws, or other government information.

The user interface module may be configured to provide a set of suggestions including a group of suggestions relating to the suggested sources, a group of suggestions relating to the suggested information items, a group of suggestions relating to the suggested keywords, or a group of other suggestions for presentation on a user interface.

In various implementations, the suggestion module may be configured to determine the suggested sources based on a determination that one or more identifiers of the suggested sources correspond to the received input.

In certain implementations, the user interface module may be configured to provide a query input component on a display of the user interface. The query input component may, for example, be configured to receive input. In some implementations, the query input module may be configured to receive a second input relating to the query responsive to providing the set of suggestions (that includes a group of suggestions relating to the suggested sources, a group of suggestions relating to the suggested information items, a group of suggestions relating to the suggested keywords, or a group of other suggestions). The information retrieval module may be configured to determine a subset of the information items that relates to the received second input. The information retrieval module may be configured to determine one or more sources associated with the determined subset of the information items. The user interface module may provide one or more representations of the determined subset of the information items and one or more representations of the determined sources on the display of the user interface simultaneously with the query input component.

In various implementations, the user profile module may be configured to determine a source set associated with a user. The source set may, for example, include at least one source associated with the user. The suggestion module may be configured to determine second suggested ones of the predefined sources that are not included in the source set. The user interface module may be configured to provide a group of suggestions relating to the suggested sources on the display of the user interface simultaneously with the query input component, the representations of the determined subset of the information items, and the representations of the determined sources (e.g., the sources of the predefined sources that relate to the determined subset of the information items) based on a determination that the second suggested sources are not included in the source set.

In certain implementations, the information retrieval module may be configured to determine one or more first information items of the determined subset of the information items and one or more second information items of the determined subset of the information items based on one or more filters. In various implementations, the information retrieval module may be configured to determine the first information items of the determined subset based on one or more first filters. The information retrieval module may be configured to determine the second information items of the determined subset based on one or more second filters. The user interface module may be configured to provide one or more representations of the first information items in a first area on the display of the user interface and one or more representations of the second information items in a second area on the display of the user interface.

In some implementations, the first filters may relate to one or more of first political entities, first government entities, or first legislations. The second filters may relate to one or more of second political entities, second government entities, or second legislations. By way of example, political or government entities may include political parties (e.g., Democrat, Republican, Independent, etc.), political or government organizations, political or government figures, or other political or government entities. Legislations may include amendments, bills, laws, resolutions, or other legislation.

In certain implementations, the user profile module may be configured to determine a source set associated with a user. The source set may, for instance, include at least one source associated with the user. The user interface module may be configured to provide one or more representations to modify the source set on the display of the user interface simultaneously with the query input component, the representations of the determined subset (e.g., the subset of the information items that relate to the received input), and the representations of the determined sources (e.g., the sources of the predefined sources that relate to the determined subset of the information items).

In some implementations, the user profile module may be configured to determine that the source set includes a first source of the determined sources (e.g., the sources of the predefined sources that relate to the determined subset of the information items). The user profile module may be configured to determine that the source set do not include a second source of the determined sources. In one or more implementations, the representations of the modify options may include a representation of an option to remove the first source from the source set based on the determination that the source set includes the first source and a representation of an option to add the second source to the source set based on the determination that the source set does not include the second source.

In various implementations, the user profile module may be configured to associate one or more first item types with a primary item type set based on one or more inputs corresponding to selection of the first item types. The user interface module may be configured to provide one or more representations of first information items of the determined subset (e.g., the subset of the information items that relate to the received input) in a primary area on the display of the user interface based on a determination that the first information items are associated with the first item types. The user interface module may be configured to provide one or more representations of second information items of the determined subset in a secondary area on the display of the user interface based on a determination that the second information items are associated with one or more second item types. The primary area and the secondary area may, for example, be provided on the display of the user interface simultaneously with the query input component and the determined sources (e.g., the sources of the predefined sources that relate to the determined subset of the information items).

In some implementations, the user interface module may be configured to provide one or more representations of options to select or unselect a plurality of item types to modify the primary item type set on the display of the user interface simultaneously with the query input component, the representations of the determined sources, the primary area, and the secondary area. In one or more implementations, the user interface module may be configured to provide the representations of the first information items in the primary area and the representations of the second information items in the secondary area based on one or more inputs corresponding to selecting the first item types of the plurality of item types or unselecting the second item types of the plurality of item types.

In certain implementations, the user interface module may be configured to remove the secondary area from view on the display of the user interface based on a determination that each of the plurality of item types is selected.

In some implementations, the user interface module may be configured to provide one of the information items of the determined subset on a second display of the user interface. The suggestion module may be configured to determine suggested keywords that relate to a second query and the presented information item. The user interface module may be configured to provide a group of suggestions relating to the suggested keywords on the second display of the user interface simultaneously with the presented information item.

In certain implementations, the indexing module may be configured to store metadata in association with the predefined sources or the information items of the predefined sources. The metadata may indicate a first attribute relating to first ones of the predefined sources or the information items, a second attribute relating to second ones of the predefined sources or the information items, or other attribute. In some implementations, the first attribute may include a first political or government entity, or other attribute. The second attribute may include a second political or government entity, or other attribute. In one or more implementations, the first political or government entity may include a first political party, a first political or government organization, a first political or government figure, or other entity. The second political or government entity is a second political party, a second political or government organization, a political or government figure, or other entity.

In various implementations, the query input module may receive a second input relating to the query responsive to the set of suggestions (that include a group of suggestions relating to the suggested sources, a group of suggestions relating to the suggested information items, a group of suggestions relating to the suggested keywords, or a group of other suggestions) provided by the user interface module.

The comparison module may be configured to generate a comparison between the first attribute and the second attribute based on the received second input. In some implementations, the user interface module may be configured to provide a presentation of the generated comparison on the display of the user interface simultaneously with the query input component.

In certain implementations, the query input module may be configured to receive an input relating to a query. The information retrieval module may be configured to determine a subset of information items of the predefined sources that relate to the received input. In some implementations, the comparison module may be configured to generate the comparison based on one or more first sources of the predefined sources associated with the determined subset that relate to the first attribute and one or more second sources of the predefined sources associated with the determined subset that relate to the second attribute. In one or more implementations, the comparison module may be configured to generate the comparison based on one or more first information items of the determined subset that relate to the first attribute and one or more second information items of the determined subset that relate to the second attribute. In various implementations, the user interface module may be configured to provide a presentation of the comparison on a display of a user interface simultaneously with one or more representations of the determined subset of the information items.

These and other features of the present invention, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

The invention is illustrated by way of example, and not by way of limitation, in the figures of the accompanying drawing and in which like reference numerals refer to similar elements.

FIGS. 3B-3I illustrate exemplary diagrams of components of a display of a user interface, in accordance with one or more implementations.

FIG. 4A illustrates an exemplary diagram of a display of a user interface, in accordance with one or more implementations.

FIG. 6 illustrates a flowchart of processing operations for facilitating queries of a topic-based-source-specific search system, in accordance with one or more implementations.

FIG. 8 illustrates a flowchart of processing operations for facilitating comparisons of predefined source attributes based on queries of a topic-based-source-specific search system, in accordance with one or more implementations.

DETAILED DESCRIPTION OF THE INVENTION

In the following description, for the purposes of explanation, numerous specific details are set forth in order to provide a thorough understanding of the implementations of the invention. It will be appreciated, however, by one skilled in the art that the implementations of the invention may be practiced without these specific details or with an equivalent arrangement. In other instances, well-known structures and devices are shown in block diagram form in order to avoid unnecessarily obscuring the implementations of the invention. It should be noted that features (e.g., components, operations, or other features) described herein may be implemented separately or in combination with one another.

Figure 1:
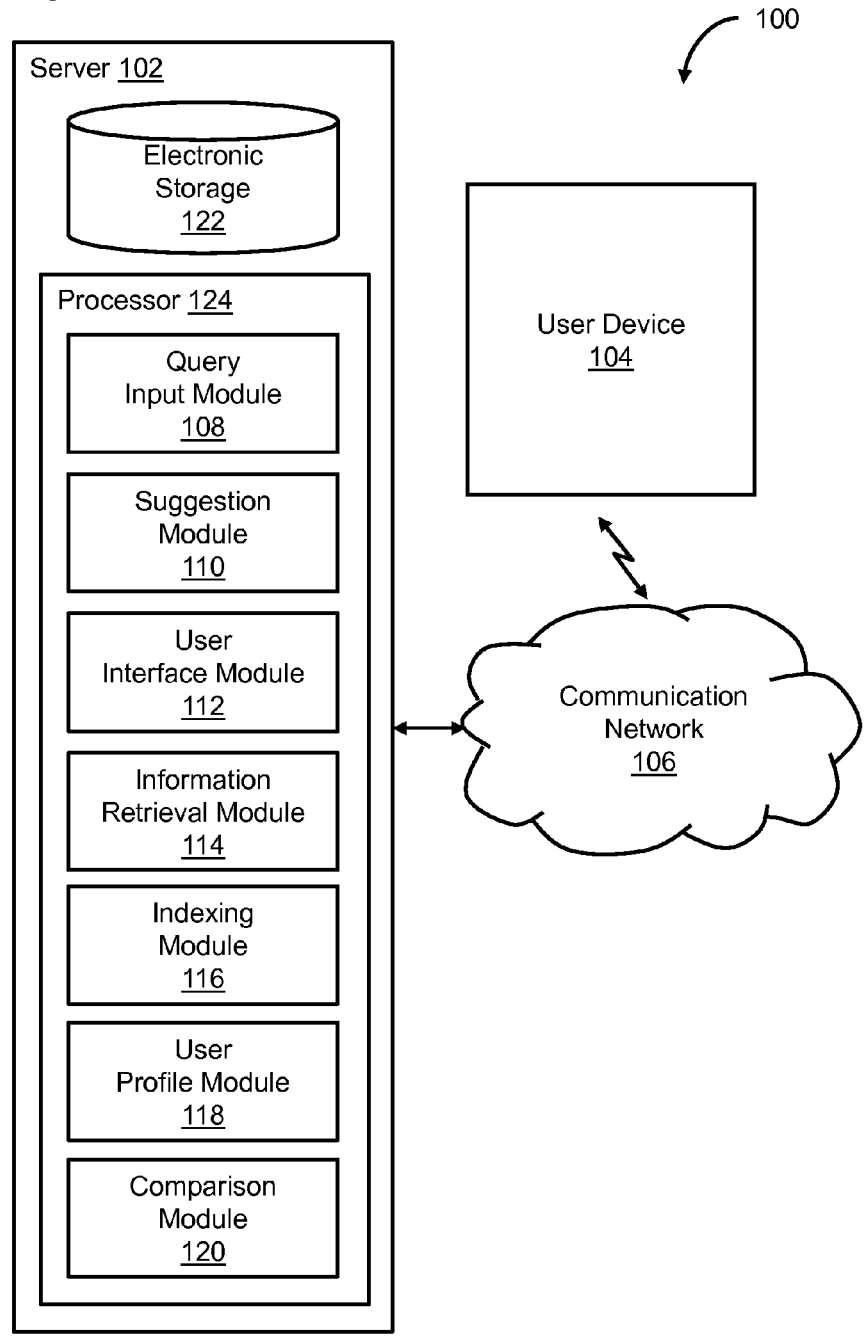
FIG. 1 illustrates a diagram of a system for facilitating queries of a topic-based-source-specific search system, in accordance with one or more implementations.

FIG. 1 illustrates a diagram of system 100 for facilitating queries of a topic-based-source-specific search system, in accordance with one or more implementations. System 100 may comprise the topic-based-source-specific search system. The topic-based-source-specific search system may include one or more servers 102. Server 102 (or servers 102) may be configured to communicate with one or more user devices 104 according to a client/server architecture (e.g., over communication network 106 or via other communication medium). Users may access system 100 via user devices 104.

Server 102 may be configured to execute one or more computer program modules to facilitate queries of a topic-based-source-specific search system. The computer program modules may include a query input module 108, a suggestion module 110, a user interface module 112, an information retrieval module 114, an indexing module 116, a user profile module 118, a comparison module 120, or other modules.

In certain implementations, the topic-based-search-specific search system may be configured to collect information from predefined sources relating to a content topic prior to queries of the topic-based-search-specific search system. In some implementations, the content topic may correspond to government information or other type of information. The search system may, for example, determine the predefined sources and collect information from the predefined sources using techniques as described in U.S. patent application Ser. No. 11/430,145, entitled "System and Method for Collecting, Processing, and Presenting Selected Information From Selected Sources via a Single Website," filed May 9, 2006, which is hereby incorporated by reference on its entirety.

Query input module 108 may be configured to receive an input relating to a query. In one scenario, the received input may correspond to a portion of a query that a user has not yet submitted or otherwise completed. The received input may, for instance, represent at least a portion of a query that the user may submit. In another scenario, the received input may correspond to a complete query.

Suggestion module 110 may be configured to determine suggested ones of the predefined sources, suggested ones of information items of the predefined sources, one or more suggested keywords, or other suggestions based on the received input. In certain implementations, the information items of the predefined sources may relate to press releases, speeches, opinions, statements, legislations, or other government information. Formats of the information items may correspond to one or more of textual formats, image formats, audio formats, video formats, or other formats. In some implementations, the suggested information items may relate to bills, laws, or other government information.

User interface module 112 may be configured to provide a set of suggestions including a group of suggestions relating to the suggested sources, a group of suggestions relating to the suggested information items, a group of suggestions relating to the suggested keywords, or a group of other suggestions for presentation on a user interface.

Figure 2:
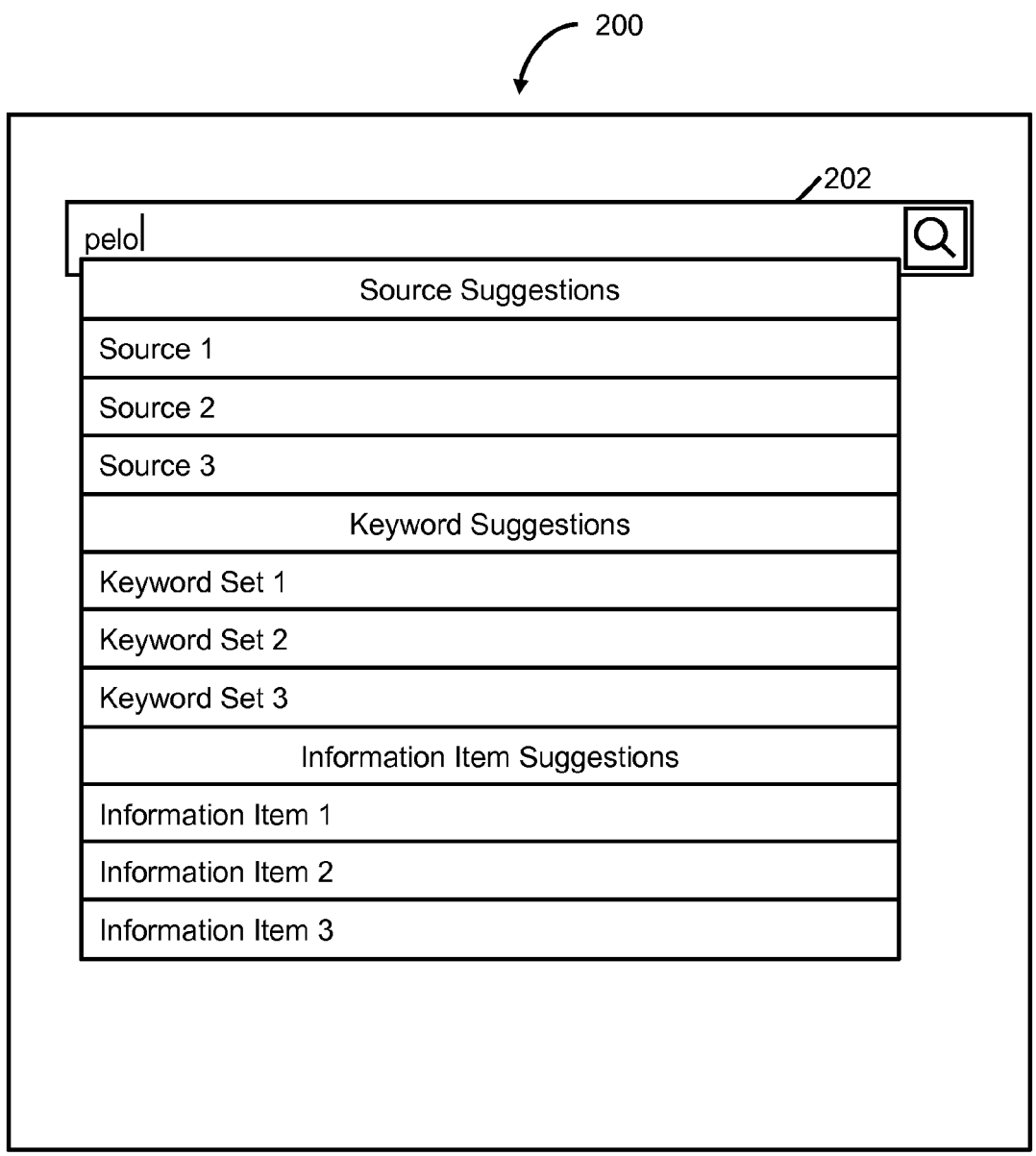
FIG. 2 illustrates an exemplary diagram of a display of a user interface that presents a query input component and suggestions relating to received input entered via the query input component, in accordance with one or more implementations.

For example, FIG. 2 illustrates an exemplary diagram of a display 200 of a user interface that presents a query input component 202 and suggestions relating to received input entered via query input component 202, in accordance with one or more implementations. As shown by FIG. 2, "pelo" may be a portion of a query that has been entered via query input component 202. Responsive to the portion of the query being entered, source suggestions, keyword suggestions, and information item suggestions that relate to the portion of the query or a predicted query of the query portion (e.g., "pelosi," "pelosi remarks," etc.) may be presented on display 200 simultaneously with query input component 202.

In one use case, the source suggestions (e.g., Source 1, Source 2, Source 3, etc.) may identify sources with source names that include terms or phrases relating to the portion of the query or the predicted query, sources that include information items that indicate terms or phrases relating to the portion of the query or the predicted query, or other related sources. The source suggestions may, for example, be determined based on frequency that the information items of the respective sources indicate the related terms or phrases (e.g., selecting source suggestions from sources with the greatest amounts of information items that indicate the related terms or phrases are selected as source suggestions, sources with the greatest average frequencies of the related terms or phrases in their respective information items, etc.). The order of the source suggestions in the depicted list may be based on frequency that the information items of the respective sources indicate the related terms or phrases (e.g., suggested sources associated with greater frequencies are placed higher on the list, suggested sources associated with lower frequencies are placed lower on the list, etc.).

In another use case, the keyword suggestions (e.g., Keyword Set 1, Keyword Set 2, Keyword Set 3, etc.) may identify predicted keywords or other related keywords. The keyword suggestions or the order of the keyword suggestions may, for example, be based on frequency information relating to the suggested keywords. In yet another use case, the information item suggestions may identify information items of the predefined sources that indicates terms or phrases relating to the portion of the query or the predicted query, or other related information items. The information item suggestions or the order of the information item suggestions may, for example, be based on frequency information relating to the suggested information items.

In various implementations, suggestion module 110 may be configured to determine the suggested sources based on a determination that one or more identifiers of the suggested sources correspond to the received input. With respect to FIG. 2, for example, the source suggestions may include "Rep. Pelosi, Nancy—(D—CA)," "Office of the Democratic Leader—Nancy Pelosi," etc. In some implementations, suggestion module 110 may be configured to determine the suggested sources based on a determination that information items of the suggested sources correspond to the received input.

In certain implementations, user interface module 112 may be configured to provide a query input component on a display of the user interface. The query input component may, for example, be configured to receive input. In some implementations, query input module 108 may be configured to receive a second input relating to the query responsive to providing the set of suggestions (that includes a group of suggestions relating to the suggested sources, a group of suggestions relating to the suggested information items, a group of suggestions relating to the suggested keywords, or a group of other suggestions). Information retrieval module 114 may be configured to determine a subset of the information items that relates to the received second input. Information retrieval module 114 may be configured to determine one or more sources associated with the determined subset of the information items. User interface module 112 may provide one or more representations of the determined subset of the information items and one or more representations of the determined sources on the display of the user interface simultaneously with the query input component.

Figure 3A:
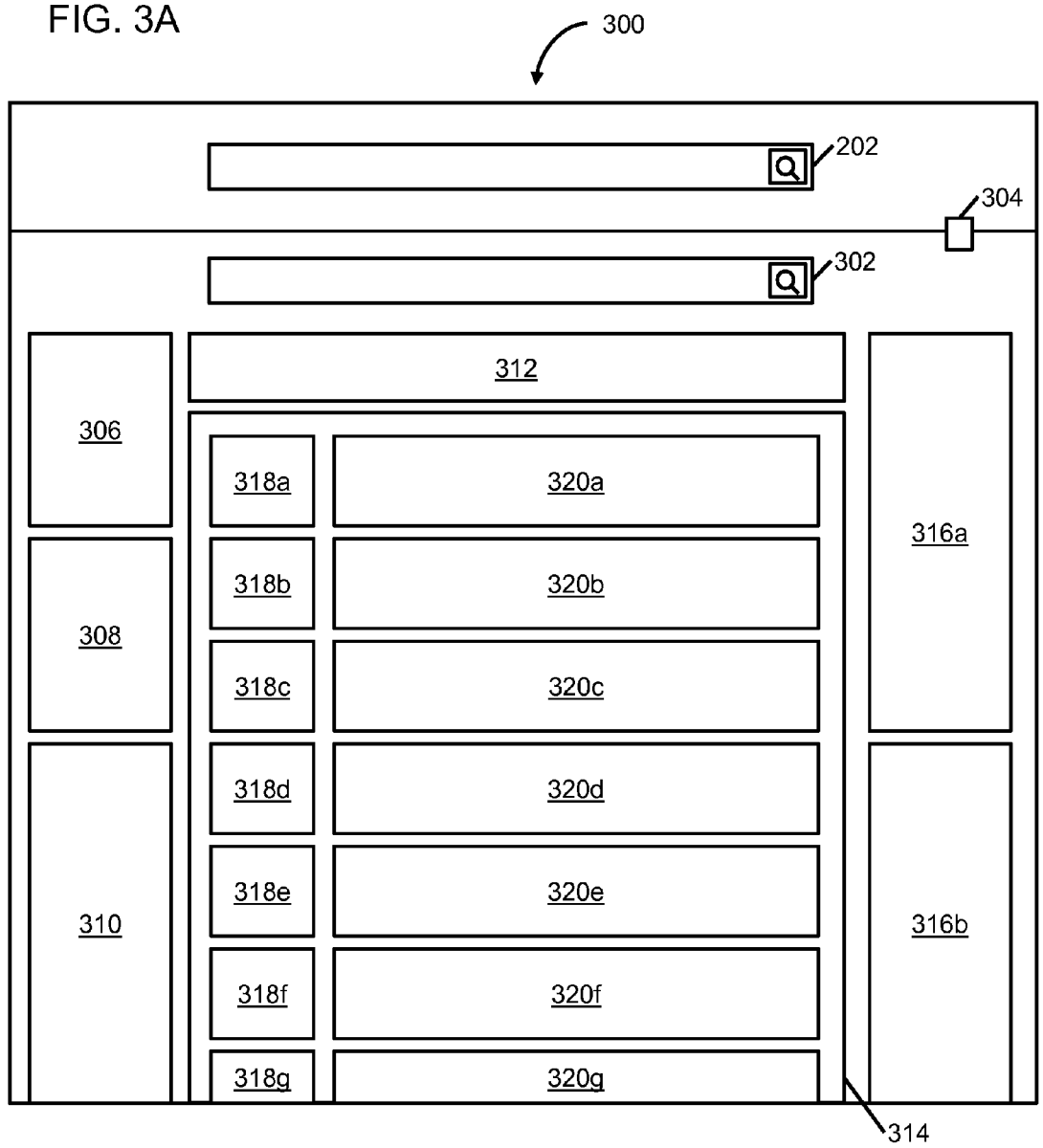
FIG. 3A illustrates an exemplary diagram of a display of a user interface, in accordance with one or more implementations.

For example, FIG. 3A illustrates an exemplary diagram of a display 300 of a user interface, in accordance with one or more implementations. As shown by FIG. 3A, display 300 may include query input components 202 and 302. In one use case, query input component 202 may be configured to receive input for a new search query. Query input component 302 may be configured to receive input to search within a current set of search results. Representation 304 may be a representation of an option to save the current set of search results, save a query input corresponding to the current set of search results, or save other information. The saved information may, for example, be stored in a user profile of a user.

As depicted by FIG. 3A, for example, display 300 may include feed area 306, filter areas 308 and 310, item type selection area 312, a primary information item area 314, one or more secondary information item areas 316. Primary information item area 314 may include one or more source representation areas 318 and corresponding item description areas 320. In one use case, responsive to selection of a suggested keyword via a drop-drop menu of suggestions that is presented based on a first input entered into query input component 202, information items that relate to the suggested keyword may be determined along with one or more sources that are associated with the determined information items. Representations of the determined sources and representations of the determined information items may be presented on primary information item area 314 (e.g., source representation areas 318, item description areas 320, etc.) and secondary information item areas 316.

In various implementations, user profile module 118 may be configured to determine a source set associated with a user. The source set may, for example, include at least one source associated with the user. Suggestion module 110 may be configured to determine second suggested ones of the predefined sources that are not included in the source set. User interface module 112 may be configured to provide a group of suggestions relating to the suggested sources on the display of the user interface simultaneously with the query input component, the representations of the determined subset of the information items, and the representations of the determined sources (e.g., the sources of the predefined sources that relate to the determined subset of the information items) based on a determination that the second suggested sources are not included in the source set.

Figure 3B:
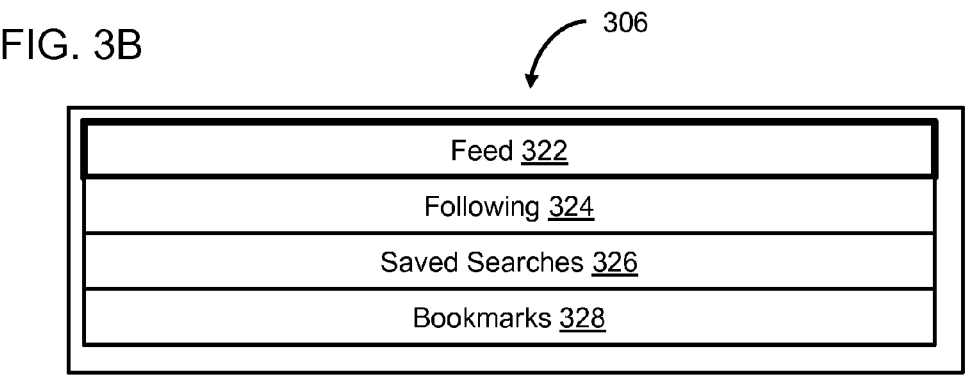
Figure 3C:
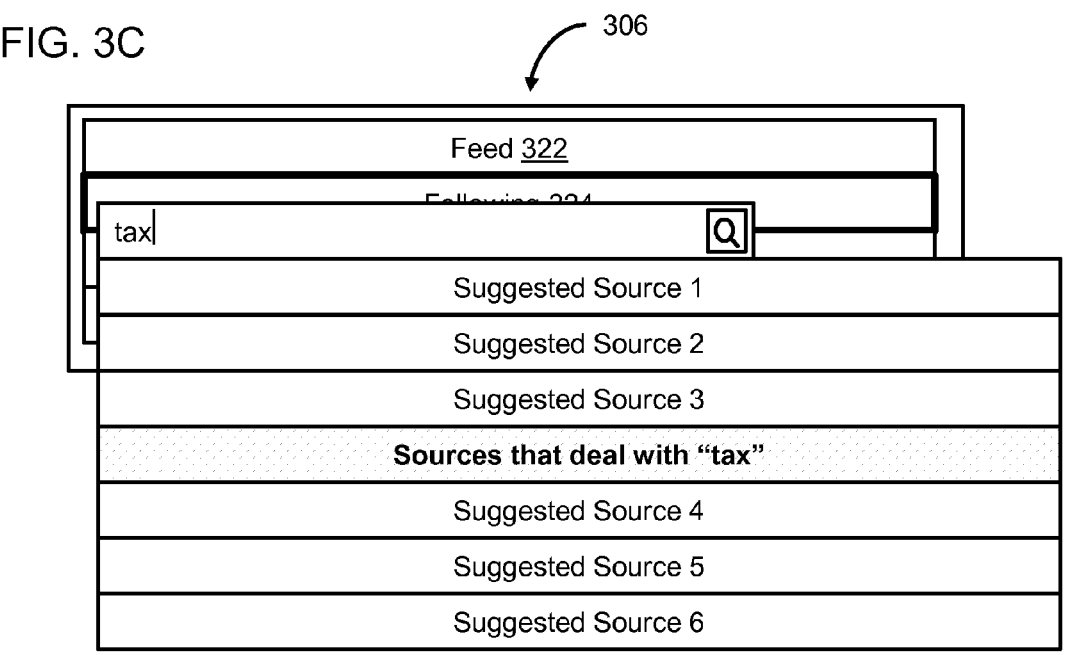

For example, with respect to FIGS. 3B and 3C, feed area 306 may include sub-areas 322, 324, 326, and 328. In one use case, when sub-area 322 (e.g., "Feed") is selected, representations of sources that a user is following and representations of information items of the followed sources may be presented in the primary information item area 314 and the secondary information item areas 316. The representations of the followed sources and the representations of the information items of the followed sources may, for example, be ordered in the primary information item area 314 and the secondary information item areas 316 based on relevancy, date, or other criteria.

When sub-area 324 (e.g., "Following") is selected, a query input component may be presented in display 300 that is configured to receive inputs relating to a query of sources that are not currently followed by the user. Initially, for example, suggested ones of the sources that are not currently followed by the user may be determined based on relevancy of the sources to the user (e.g., the suggested not-currently-followed sources may relate to the information items of the followed sources, the information items resulting from a query search, a bookmarked information item, etc.), and presented on display 300 as a drop-down menu over feed area 306. Upon input being entered in the field of the query input component depicted in FIG. 3C, the suggested non-currently-followed sources may be updated to reflect the entered input. For example, responsive to "tax" being entered, non-currently followed sources that relate to the input "tax" may be presented as suggested sources on display 300. Suggested Sources 1-3 may, for instance, be associated with source identifiers that correspond to the input "tax." Suggested Sources 4-6 may be associated with information items that "deal with 'tax.'"

In certain implementations, information retrieval module 114 may be configured to determine one or more first information items of the determined subset of the information items and one or more second information items of the determined subset of the information items based on one or more filters. For example, with respect to FIGS. 3D and 3E, filters areas 308 and 310 may enable refinement of the sources and the information items that are represented in primary information item area 314 and secondary information item areas 316. One or more of the filters (e.g., keywords, figures, organizations, places, date, party affiliation, state delegation, or other filters) may be selected to refine the represented sources and information items in primary information item area 314 and secondary information item areas 316. Filter areas 308 and 310 may be expanded to provide additional filters in display 300 or in another display.

In various implementations, information retrieval module 114 may be configured to determine the first information items of the determined subset based on one or more first filters. Information retrieval module 114 may be configured to determine the second information items of the determined subset based on one or more second filters. User interface module 112 may be configured to provide one or more representations of the first information items in a first area on the display of the user interface and one or more representations of the second information items in a second area on the display of the user interface. In one use case, with respect to FIG. 3E, "Time Range 1" and "Party 1" may be selected as the first filters, and "Time Range 1" and "Party 2" may be selected as the second filters. As such, for instance, information items of the determined subset that relate to "Time Range 1" and "Party 1" may be represented in a first list in display 300, and information items of the determined subset that relate to "Time Range 1" and "Party 2" may be represented in a second list in display 300 (e.g., side-by-side lists, primary list and secondary list, etc.). In this way, among other benefits, system 100 may enable users to compares the different filtered result sets alongside one another on a single display and modify the respective filtered sets to update each of the filtered result sets on the single display.

In some implementations, the first filters may relate to one or more of first political entities, first government entities, or first legislations. The second filters may relate to one or more of second political entities, second government entities, or second legislations. By way of example, political or government entities may include political parties (e.g., Democrat, Republican, Independent, etc.), political or government organizations, political or government figures, or other political or government entities. Legislations may include amendments, bills, laws, resolutions, or other legislation.

In certain implementations, user profile module 118 may be configured to determine a source set associated with a user. The source set may, for instance, include at least one source associated with the user. User interface module 112 may be configured to provide one or more representations to modify the source set on the display of the user interface simultaneously with the query input component, the representations of the determined subset (e.g., the subset of the information items that relate to the received input), and the representations of the determined sources (e.g., the sources of the predefined sources that relate to the determined subset of the information items).

Figure 3F:
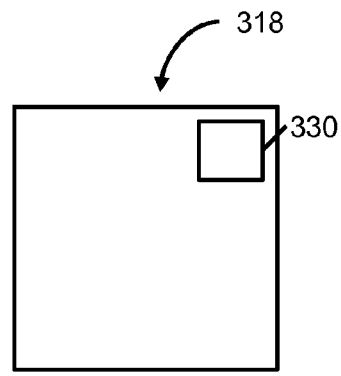

For example, with respect to FIG. 3F, each of the source representation areas 318 that are provided on display 300 may include a source-set-modifier 330 (e.g., "+" to add a source to the source set, "−" to remove a source from the source set, etc.). A user may, for instance, follow or unfollow a particular source using source-set-modifier 330 to add or remove the source to/from the source set associated with the user. Thus, among other benefits, a user may quickly follow or unfollow sources based on individual ones of the information items that are presented on display 300 without necessarily having to directly search for or access the sources. In one scenario, if a source-set-modifier 330 corresponding to the source is a representation of an option to add the source, a single click or touch (or other input corresponding to selecting the option) may trigger user profile module 118 to add the source to the source set associated with the user. If the source-set-modifier 330 corresponding to the source is a representation of an option to remove the source, a single click or touch may trigger user profile module 118 to remove the source from the source set associated with the user. In another scenario, a click or touch (or other input corresponding to selecting the option) of source-set-modifier 330 may prompt the user with a request to add or remove the source to/from the source set associated with the user.)

In some implementations, user profile module 118 may be configured to determine that the source set includes a first source of the determined sources (e.g., the sources of the predefined sources that relate to the determined subset of the information items). User profile module 118 may be configured to determine that the source set do not include a second source of the determined sources. In one or more implementations, the representations of the modify options may include a representation of an option to remove the first source from the source set based on the determination that the source set includes the first source and a representation of an option to add the second source to the source set based on the determination that the source set does not include the second source.

For example, with respect to FIGS. 3A and 3F, if the source corresponding to source representation area 318*a* and item description area 320*a* is a source that a user currently follows (e.g., the source set includes the source corresponding to areas 318*a* and 320*a*), the source-set-modifier 330 in source representation area 318*a* may depict a "−" symbol to indicate the option to unfollow the source corresponding to areas 318*a* and 320*a*. On the other hand, if the source corresponding to source representation area 318*b* and item description area 320*b* is a source that the user is not currently following (e.g., the source set does not include the source corresponding to areas 318*b* and 320*b*), the source-set-modifier 330 in source representation area 318*b* may depict a "+" symbol to indicate the option to follow the source corresponding to areas 318*b* and 320*b*. In this way, among other benefits, system 100 may enable users to quickly determine related sources that they currently follow or do not follow as the users browse the representations of the information items on display 300.

In various implementations, user profile module 118 may be configured to associate one or more first item types with a primary item type set based on one or more inputs corresponding to selection of the first item types. User interface module 112 may be configured to provide one or more representations of first information items of the determined subset (e.g., the subset of the information items that relate to the received input) in a primary area on the display of the user interface based on a determination that the first information items are associated with the first item types. User interface module 112 may be configured to provide one or more representations of second information items of the determined subset in a secondary area on the display of the user interface based on a determination that the second information items are associated with one or more second item types. The primary area and the secondary area may, for example, be provided on the display of the user interface simultaneously with the query input component and the determined sources (e.g., the sources of the predefined sources that relate to the determined subset of the information items).

Figure 3G:
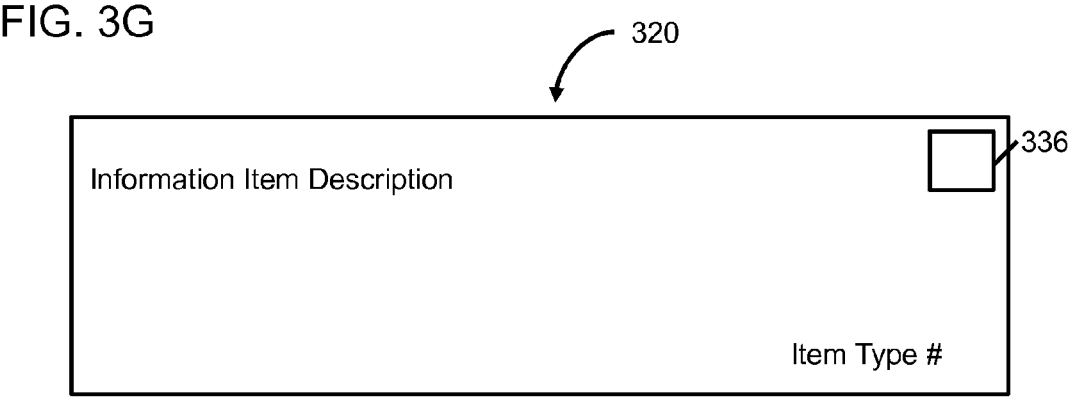
Figure 3H:
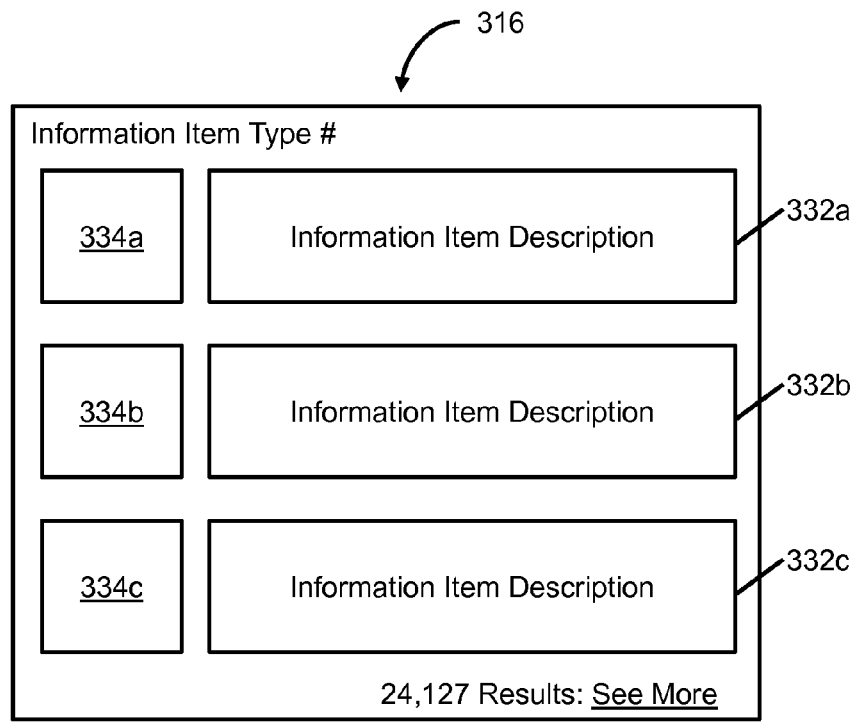

By way of example, with respect to FIGS. 3G and 3H, individual ones of the information items associated with the first item types may be represented by item description areas 320 in primary information item area 314 alongside a corresponding source representation area 318 (e.g., that includes a graphical representation of the source), and individual ones of the information items associated with the second item types may be represented by item description areas 332 in secondary information item area 316 alongside a corresponding source representation area 334 (e.g., that includes a graphical representation of the source). Individual ones of the item description areas 320 in primary information item area 314 may include more area for details (e.g., title of an information item, type of an information item, number of words in an information item, length or duration of an information item, date of an information item, etc.) relating to the corresponding information item than individual ones of the item description areas 332 in secondary information item area 316. As depicted by FIGS. 3G and 3H, individual ones of the item description areas 320 in primary information item area 314 may include a representation 336 of an option to bookmark, share, or initiate other operations, and individual ones of the item description areas 332 in secondary information item area 316 may not include such a representation.

In some implementations, user interface module 112 may be configured to provide one or more representations of options to select or unselect a plurality of item types to modify the primary item type set on the display of the user interface simultaneously with the query input component, the representations of the determined sources, the primary area, and the secondary area. In one or more implementations, user interface module 112 may be configured to provide the representations of the first information items in the primary area and the representations of the second information items in the secondary area based on one or more inputs corresponding to selecting the first item types of the plurality of item types or unselecting the second item types of the plurality of item types.

Figure 3I:
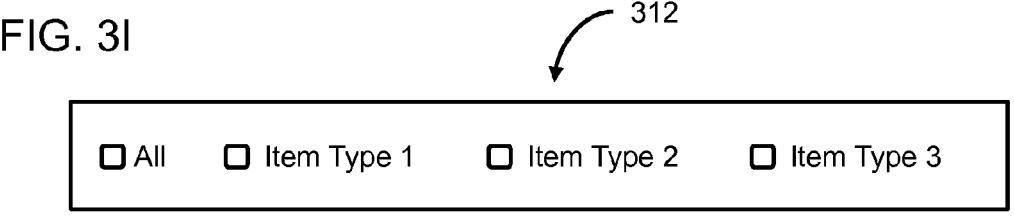

For example, with respect to FIG. 3I, item type selection area 312 may include selectable item types. In one use case, responsive to only "Item Type 1" being a selected item type, representations of information items associated with "Item Type 1" may be provided in primary information item area 314, and representations of information items associated with "Item Type 2" or "Item Type 3" may be provided in secondary information item areas 316. In another use case, responsive to "Item Type 3" being selected in addition to "Item Type 1" being selected, representations of information items associated with "Item Type 1" or "Item Type 3" may be provided in primary information item area 314, and representations of information items associated with "Item Type 2" may be provided in one of secondary information item areas 316. In yet another use case, responsive to "Item Type 1" being unselected (and "Item Type 3" remaining selected), representations of information items associated with "Item Type 3" may be provided in primary information item area 314, and representations of information items associated with "Item Type 1" or "Item Type 2" may be provided in secondary information item areas 316.

Figure 3J:
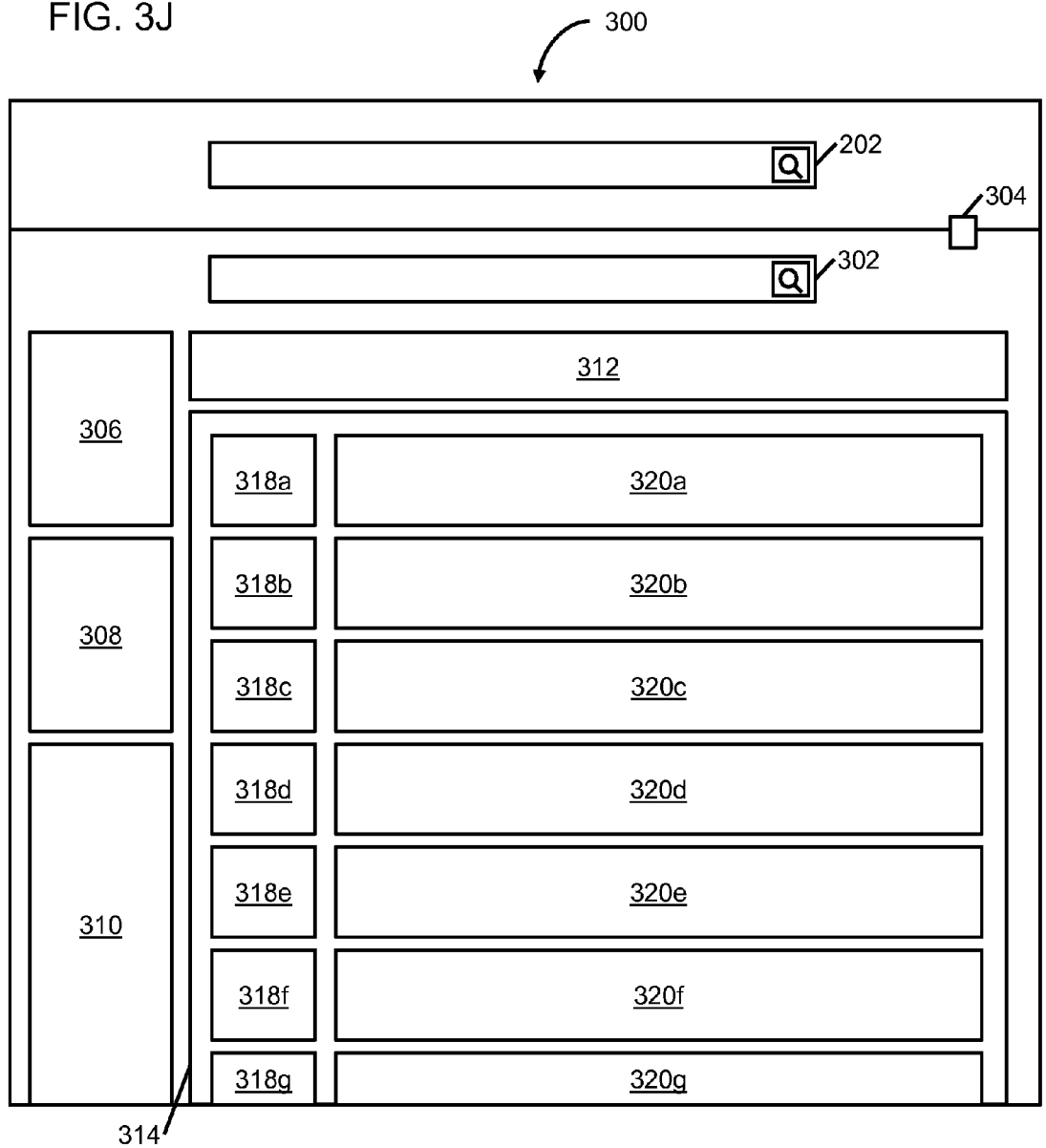
FIG. 3J illustrates an exemplary diagram of a display of a user interface, in accordance with one or more implementations.

In certain implementations, user interface module 112 may be configured to remove the secondary area from view on the display of the user interface based on a determination that each of the plurality of item types is selected. For example, with respect to FIGS. 3I and 3J, responsive to "Item Type 1," "Item Type 2," and "Item Type 3" being selected, secondary information item areas 316 may be hidden, collapsed, or otherwise removed from view on display 300. As depicted in FIG. 3J, responsive to removal of secondary information item areas 316 from view on display 300, primary information item area 314 is expanded on display 300.

In some implementations, user interface module 112 may be configured to provide one of the information items of the determined subset on a second display of the user interface. Suggestion module 110 may be configured to determine suggested keywords that relate to a second query and the presented information item. User interface module 112 may be configured to provide a group of suggestions relating to the suggested keywords on the second display of the user interface simultaneously with the presented information item.

Figure 4B:
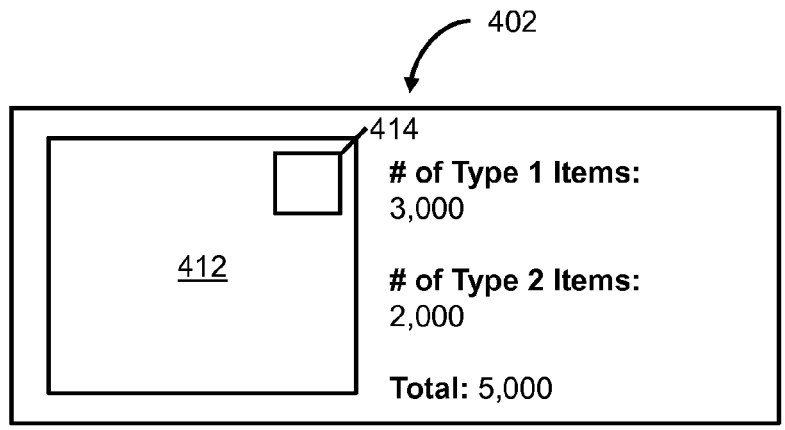
FIGS. 4B-4F illustrate exemplary diagrams of components of a display of a user interface, in accordance with one or more implementations.
Figure 4C:
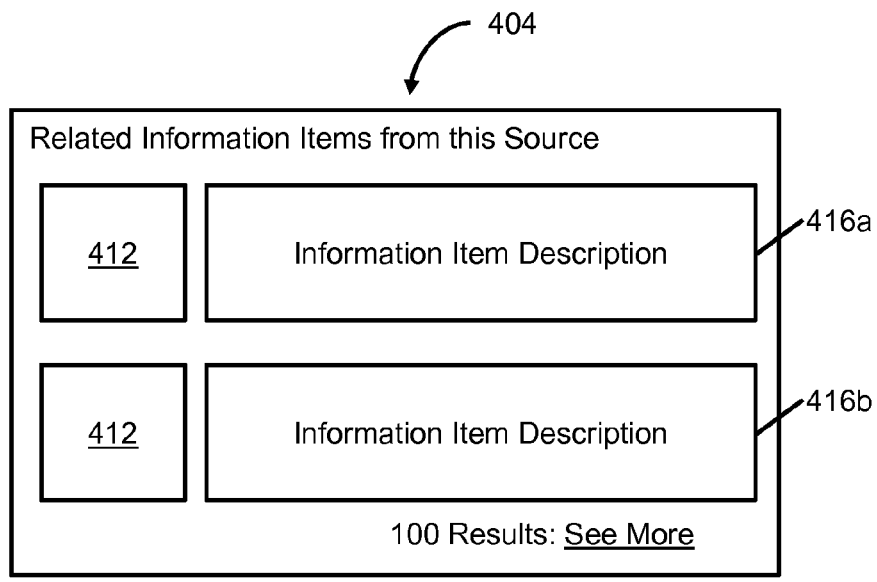

For example, with respect to FIG. 4A, display 400 may include a source representation area 402, a related information item area 404, a query suggestion area 406, a general information area 408, and a main content area 410. As shown by FIG. 4B, source representation area may provide a representation (e.g., graphical representation or other representation) of the source of the presented information item, a summary of the source (e.g., 3000 Type 1 Information Items, 2000 Type 2 Information Items, and 5000 Total Information Items, etc.), a representation of an option to follow or unfollow the source, or other features. As illustrated by FIG. 4C, related information item area 404 may include source representation areas 412 that correspond to the source of the presented information item, item description areas 416 that correspond to the source of the presented information item, or other features.

Figure 4D:
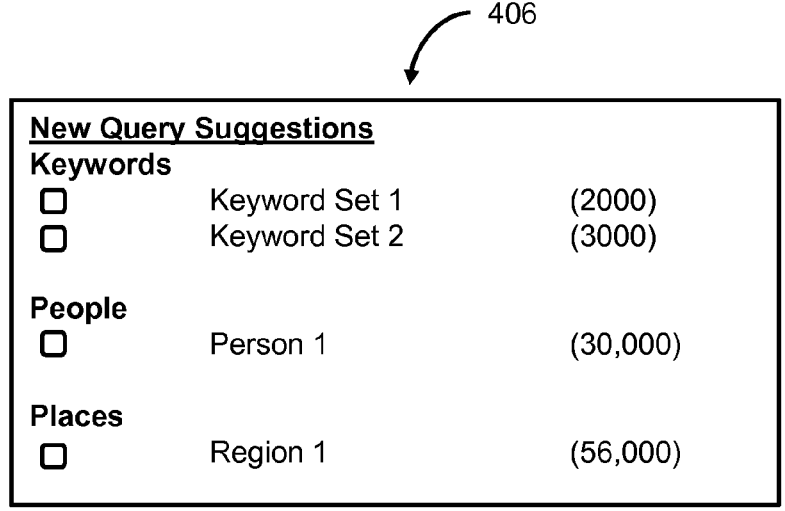

As depicted by FIG. 4D, query suggestion area 406 may include new query suggestions. The new query suggestions may include suggested keywords, suggested people, suggested places, or other suggestions. The suggested keywords, the suggested people, or the suggested places may, for example, relate to the presented information item. In one use case, with respect to FIGS. 4D, 4E, and 4F, the suggested keywords, the suggested people, or the suggested places may correspond to terms or phrases in general information area 408 and main content area 410 (e.g., query keywords that generated search results having the presented information item, terms or phrases corresponding to related links in presented information item, near-matches terms or phrases corresponding to the query keywords, etc.).

Figure 4E:
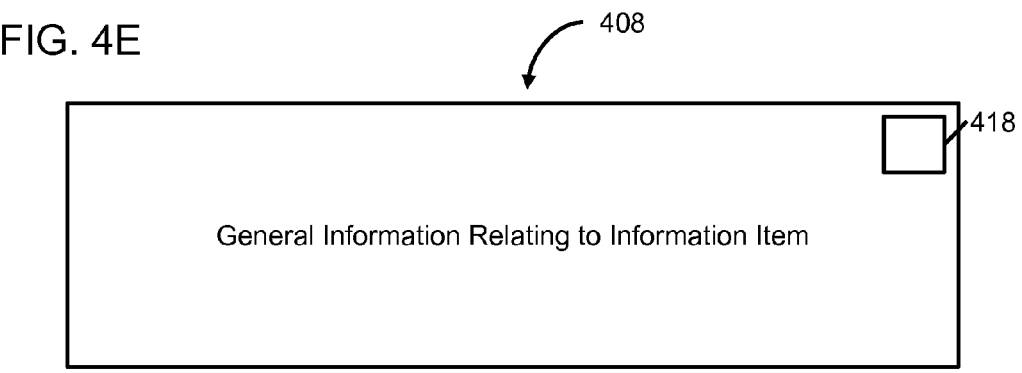
Figure 4F:
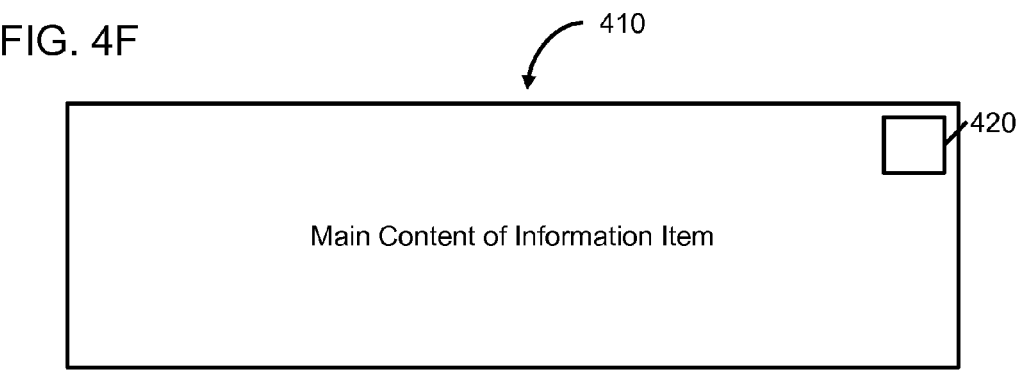

As shown by FIG. 4E, general information area 408 may include general information relating to the presented information item, a representation 418 of an option to bookmark the presented information item, share the presented information item, or perform other operations relating to the presented information item, or other features. As depicted by FIG. 4F, main content area 410 may include the main content of the presented information item, a representation 420 of an option to bookmark the presented information item, share the presented information item, or perform other operations relating to the presented information item, or other features. In one use case, portions of general information area 408 or main content area 410 may be highlighted with one or more distinguishing features to indicate relevance or other indications. As an example, query keywords that generated search results having the presented information item may be highlighted a first color, terms or phrases corresponding to related links in presented information item may be highlighted a second color, near-matches terms or phrases corresponding to the query keywords may be highlighted a third color, etc.

In certain implementations, indexing module 116 may be configured to store metadata in association with the predefined sources or the information items of the predefined sources. The metadata may indicate a first attribute relating to first ones of the predefined sources or the information items, a second attribute relating to second ones of the predefined sources or the information items, or other attribute. In some implementations, the first attribute may include a first political or government entity, or other attribute. The second attribute may include a second political or government entity, or other attribute. In one or more implementations, the first political or government entity may include a first political party, a first political or government organization, a first political or government figure, or other entity. The second political or government entity is a second political party, a second political or government organization, a political or government figure, or other entity.

In various implementations, query input module 108 may receive a second input relating to the query responsive to the set of suggestions (that include a group of suggestions relating to the suggested sources, a group of suggestions relating to the suggested information items, a group of suggestions relating to the suggested keywords, or a group of other suggestions) provided by user interface module 112. In one use case, the received second input may correspond to a selection of at least one of the provided suggestions.

Comparison module 120 may be configured to generate a comparison between the first attribute and the second attribute based on the received second input. In some implementations, user interface module 112 may be configured to provide a presentation of the generated comparison on the display of the user interface simultaneously with the query input component.

Figure 5A:
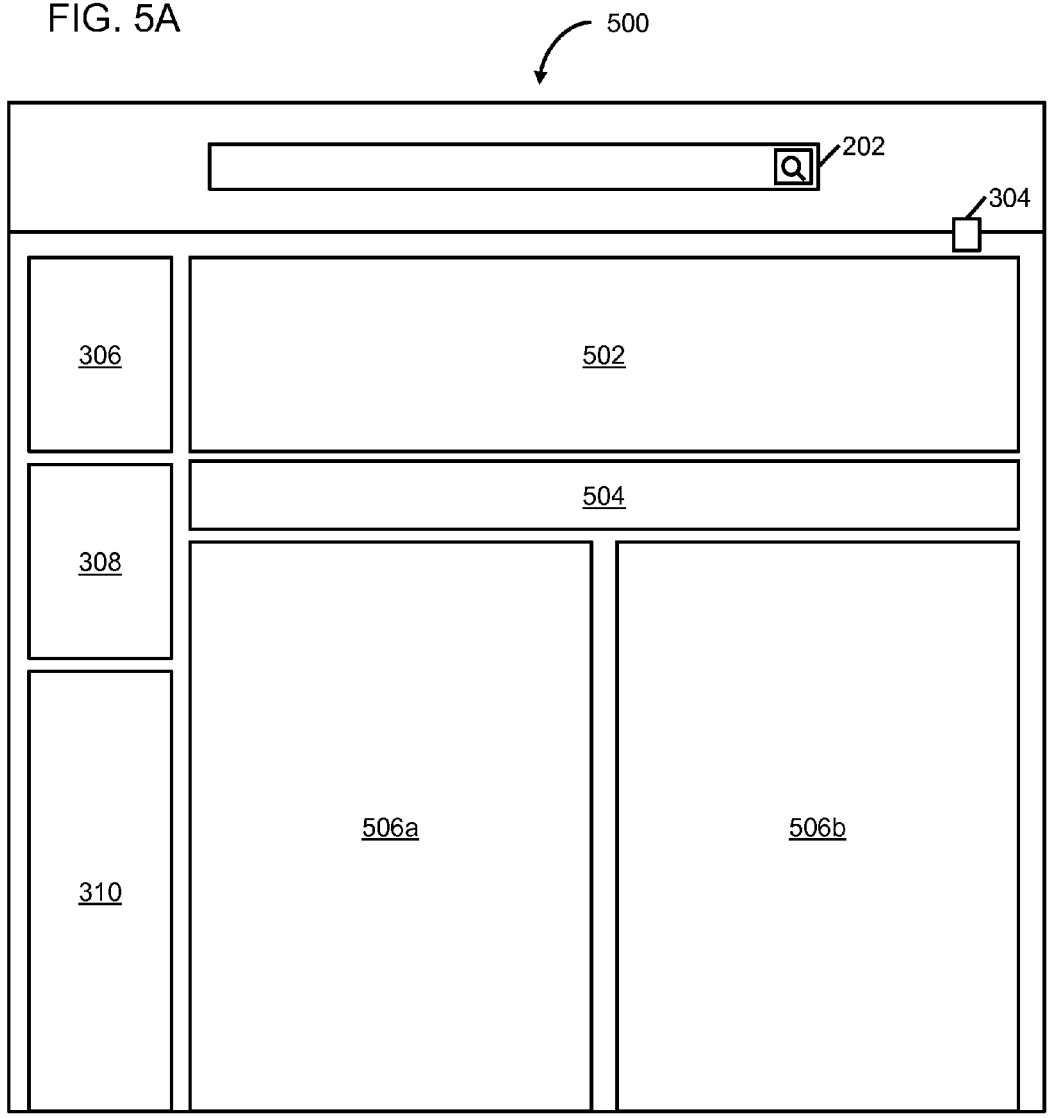
FIG. 5A illustrates an exemplary diagram of a display of a user interface, in accordance with one or more implementations.
Figure 5B:
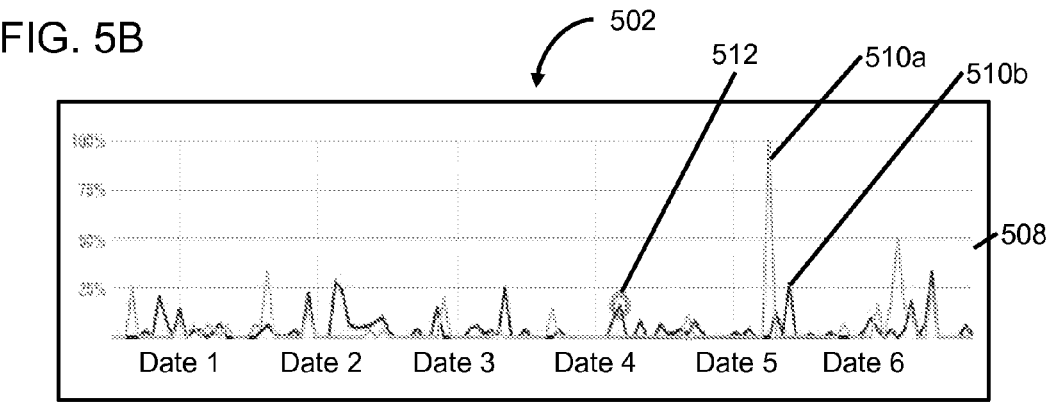
FIGS. 5B-5D illustrate exemplary diagrams of components of a display of a user interface, in accordance with one or more implementations.

For example, with respect to FIG. 5A, display 500 may include query input component 202, comparison area 502, attribute area 504, first information item area 506a, and second information item area 506b. In one scenario, with respect to FIG. 5B, a selection of suggested keywords (e.g., "health care") may generate a graph 508 shown in comparison area 502. The graph may, for example, illustrate a comparison between the percentages of information items by "Democrat" sources that mention "health care" and the percentages of information items by "Republican" sources that mention "health care" over a series of dates (e.g., Date 0-7). The line 510a may represent the percentages corresponding to "Democrat" sources, and the line 510b may represent the percentages corresponding to "Republican" sources. In another scenario, with respect to FIG. 5B, graph 508 may include selectable data points 512 along lines 510a or 510b. A user may, for example, click, touch, or otherwise select one of the data points 512 to trigger one or more presentations of information items that correspond to the selected data point 512.

Figure 5C:
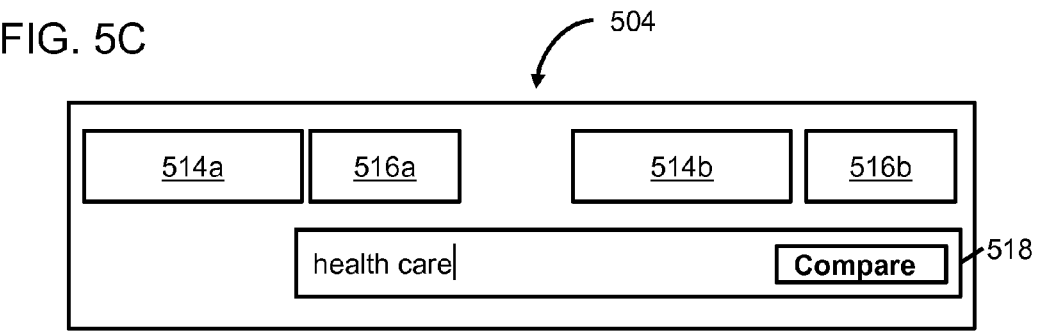

In another scenario, with respect to FIG. 5C, attribute area 504 may allow a user to view or modify the attributes being compared by graph 508 as well as the keywords from which graph 508 is based. Attribute area 504 may include query input components 514a and 514b, attribute menu components 516a and 516b, and a query input component 518. As an example, a user may utilize query input component 514a to perform a suggestive search of attributes to determine a first attribute for comparison and query input component 514b to perform a suggestive search of attributes to determine a second attribute for comparison. Responsive to determination of each attribute, the attributes to be compared may be presented respectively on attribute menu components 516a and 516b to indicate to the user the attributes to be compared. Available attributes may, for example, include "House Democrats" and "House Republicans" in general, individual politicians of the "House Democrats" or the "House Republicans," or other attributes.

As another example, attribute menu components 516a and 516b may provide a user with scrollable drop-down menus of the available attributes for comparison. The user may scroll through the drop-menus to determine the attributes to be compared. As yet another example, a user may modify the criteria (e.g., keywords or other criteria) with which the comparison of the attributes are based using query input component 518.

In certain implementations, query input module 108 may be configured to receive an input relating to a query. Information retrieval module 114 may be configured to determine a subset of information items of the predefined sources that relate to the received input. In some implementations, comparison module 120 may be configured to generate the comparison based on one or more first sources of the predefined sources associated with the determined subset that relate to the first attribute and one or more second sources of the predefined sources associated with the determined subset that relate to the second attribute. In one or more implementations, comparison module 120 may be configured to generate the comparison based on one or more first information items of the determined subset that relate to the first attribute and one or more second information items of the determined subset that relate to the second attribute.

Figure 5D:
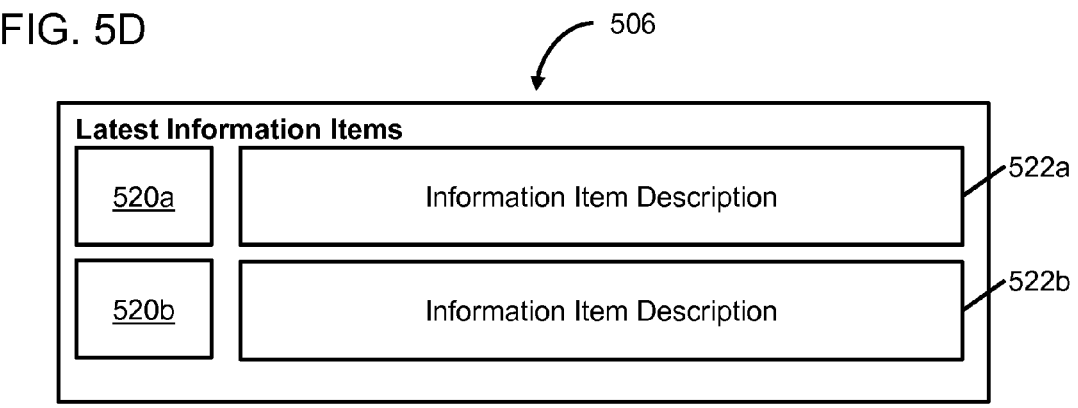

In various implementations, user interface module 112 may be configured to provide a presentation of the comparison on a display of a user interface simultaneously with one or more representations of the determined subset of the information items. For example, with respect to FIGS. 5A, 5B, 5C, and 5D, inputs entered into query input components 202 or 518 may generate a result set of information items for each of the attributes being compared along with graph 508. For example, where a first attribute being compared is "House Leaders Democrat," second attribute being compared is "Senate Leaders Democrat," and the criteria is "health care," a result set of information items that relate to "health care" and are associated with "House Leader Democrat" sources may be provided in first information item area 506a, and a result set of information items that relate to "health care" and are associated with "Senate Leader Democrat" sources may be provided in second information item area 506b. As illustrated by FIG. 5D, each of the information item areas 506a and 506b may include source representation area 520 of sources associated with the information items, item description areas 522, or other features.

User device 104 may comprise any type of mobile terminal, fixed terminal, and/or other device. For example, user device 104 may comprise a desktop computer, a notebook computer, a netbook computer, a tablet computer, a smartphone, a navigation device, an electronic book device, a gaming device, and/or any other user device. In some implementations, user device 104 may comprise the accessories and peripherals of these devices. User device 104 may also support any type of interface to the user (such as "wearable" circuitry, etc.).

Communication network 106 of system 100 may comprise one or more networks such as a data network, a wireless network, a telephony network, and/or other communication networks. A data network may comprise any local area network (LAN), metropolitan area network (MAN), wide area network (WAN), a public data network (e.g., the Internet), short range wireless network, and/or any other suitable packet-switched network. The wireless network may, for example, comprise a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium (e.g., worldwide interoperability for microwave access (WiMAX), Long Term Evolution (LTE) networks, code division multiple access (CDMA), wideband code division multiple access (WCDMA), wireless fidelity (WiFi), wireless LAN (WLAN), Bluetooth, Internet Protocol (IP) data casting, satellite, mobile ad-hoc network (MANET), etc.).

In some implementations, server 102 may include an electronic storage 122, one or more processors 124, and/or other components. Server 102 may include communication lines, or ports to enable the exchange of information with a network and/or other computing platforms. Illustration of server 102 in FIG. 1 is not intended to be limiting. Server 102 may include a plurality of hardware, software, and/or firmware components operating together to provide the functionality attributed herein to server 102. For example, server 102 may be implemented by a cloud of computing platforms operating together as server 102.

Electronic storage 122 may comprise non-transitory storage media that electronically stores information. The electronic storage media of electronic storage 122 may include one or both of system storage that is provided integrally (i.e., substantially non-removable) with server 102 and/or removable storage that is removably connectable to server 102 via, for example, a port (e.g., a USB port, a firewire port, etc.) or a drive (e.g., a disk drive, etc.). Electronic storage 122 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 122 may include one or more virtual storage resources (e.g., cloud storage, a virtual private network, and/or other virtual storage resources). Electronic storage 122 may store software algorithms, information determined by processor 124, information received from server 102, information received from user devices 104, and/or other information that enables server 102 to function as described herein. In some implementations, electronic storage may comprise a non-transitory, tangible computer-readable storage medium with an executable program stored thereon, wherein the program instructs a microprocessor to perform some or all of the functionality of modules 106, 108, 110, 112, 114, 116, 118, 120, and/or other modules.

Processor 124 is configured to provide information processing capabilities in server 102. As such, processor 124 may include one or more of a digital processor, an analog processor, a digital circuit designed to process information, an analog circuit designed to process information, a state machine, and/or other mechanisms for electronically processing information. Although processor 124 is shown in FIG. 1 as a single entity, this is for illustrative purposes only. In some implementations, processor 124 may include a plurality of processing units. These processing units may be physically located within the same device, or processor 124 may represent processing functionality of a plurality of devices operating in coordination. Processor 124 may be configured to execute modules 106, 108, 110, 112, 114, 116, 118, 120, and/or other modules. Processor 124 may be configured to execute modules 106, 108, 110, 112, 114, 116, 118, 120, and/or other modules by software; hardware; firmware; some combination of software, hardware, and/or firmware; and/or other mechanisms for configuring processing capabilities on processor 124.

It should be appreciated that although modules 106, 108, 110, 112, 114, 116, 118 and 120 are illustrated in FIG. 1 as being co-located within a single processing unit, in implementations in which processor 124 includes multiple processing units, one or more of modules 106, 108, 110, 112, 114, 116, 118, and/or 120 may be located remotely from the other modules. The description of the functionality provided by the different modules 106, 108, 110, 112, 114, 116, 118, and/or 120 described below is for illustrative purposes, and is not intended to be limiting, as any of modules 106, 108, 110, 112, 114, 116, 118, and/or 120 may provide more or less functionality than is described. For example, one or more of modules 106, 108, 110, 112, 114, 116, 118, and/or 120 may be eliminated, and some or all of its functionality may be provided by other ones of modules 106, 108, 110, 112, 114, 116, 118, and/or 120. As another example, processor 124 may be configured to execute one or more additional modules that may perform some or all of the functionality attributed below to one of modules 106, 108, 110, 112, 114, 116, 118, and/or 120.

FIG. 6 illustrates a flowchart of processing operations for facilitating queries of a topic-based-source-specific search system, in accordance with one or more implementations. The operations of process 600 presented below are intended to be illustrative. In some implementations, process 600 may be accomplished with one or more additional operations not described, and/or without one or more of the operations discussed. Additionally, the order in which the operations of process 600 are illustrated in FIG. 6 and described below is not intended to be limiting.

In certain implementations, one or more operations of process 600 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 600 in response to instructions stored electronically on an electronic storage medium. The one or more processing devices may include one or more devices configured through hardware, firmware, and/or software to be specifically designed for execution of one or more of the operations of process 600.

In certain implementations, the topic-based-source-system may be configured to collect information from predefined sources relating to a content topic prior to queries of the topic-based-source-system. In some implementations, the content topic may correspond to government information or other type of information.

In an operation 602, a query input component may be provided on a display of a user interface. The query input component may be configured to receive input. Operation 602 may be performed by a user interface module that is the same as or similar to user interface module 112, in accordance with one or more implementations.

In an operation 604, an input relating to a query may be received. Operation 604 may be performed by a query input module that is the same as or similar to query input module 108, in accordance with one or more implementations.

In an operation 606, suggested ones of the predefined sources, suggested ones of information items of the predefined sources, and one or more suggested keywords may be determined based on the received input. In certain implementations, the information items may relate to one or more of press releases, speeches, opinions, statements, legislation, or other government information. In some implementations, the selected information items may relate to bills or laws. Operation 606 may be performed by a suggestion module that is the same as or similar to suggestion module 110, in accordance with one or more implementations.

In an operation 608, a set of suggestions including a group of suggestions relating to the suggested sources, a group of suggestions relating to the suggested information items, and a group of suggestions relating to the suggested keywords may be provided for presentation on the user interface. Operation 608 may be performed by a user interface module that is the same as or similar to user interface module 112, in accordance with one or more implementations.

In an operation 610, a second input relating to the query may be received. The second input may be received responsive to providing the set of suggestions. Operation 610 may be performed by a query input module that is the same as or similar to query input module 108, in accordance with one or more implementations.

In an operation 612, a subset of the information items that relates to the received second input may be determined. Operation 612 may be performed by an information retrieval module that is the same as or similar to information retrieval module 114, in accordance with one or more implementations.

In an operation 614, one or more sources associated with the determined subset of the information items may be determined. The determined sources may include one or more political or government sources. The political or government sources may relate to one or more political parties, political or government organizations, political or government figures, or other political or government sources. Operation 614 may be performed by an information retrieval module that is the same as or similar to information retrieval module 114, in accordance with one or more implementations.

In certain implementations, one or more representations of the determined subset of the information items and one or more representations of the determined sources may be provided on the display of the user interface simultaneously with the query input component. Providing of the representations of the determined subset and the representations of the determined sources may be performed by a user interface module that is the same as or similar to user interface module 112, in accordance with one or more implementations.

In an operation 616, a source set associated with a user may be determined. The source set may include at least one source associated with the user. Operation 616 may be performed by a user profile module that is the same as or similar to user profile module 118, in accordance with one or more implementations.

In an operation 618, the source set may be determined to include a first source of the determined sources and determined not to include a second source of the determined sources. Operation 618 may be performed by a user profile module that is the same as or similar to user profile module 118, in accordance with one or more implementations.

In an operation 620, a representation of an option to remove the first source (of the determined sources) from the source set and a representation of an option to add the second source (of the determined sources) to the source set may be provided on the display of the user interface simultaneously with the query input component, the representations of the determined subset, and the representations of the determined sources. Operation 620 may be performed by a user interface module that is the same as or similar to user interface module 112, in accordance with one or more implementations.

In an operation 622, one or more first item types may be associated with a primary item type set. The first item types may be associated with the primary item type set based on one or more inputs corresponding to selection of the first item types. Operation 622 may be performed by a user profile module that is the same as or similar to user profile module 118, in accordance with one or more implementations.

In an operation 624, one or more representations of first information items of the determined subset may be provided in a primary area on the display of the user interface. The representations of the first information items may be provided in the primary area based on a determination that the first information items are associated with the first item types. Operation 624 may be performed by a user interface module that is the same as or similar to user interface module 112, in accordance with one or more implementations.

In an operation 626, one or more representations of second information items of the determined subset may be provided in a secondary area on the display of the user interface. The representations of the second information items may be provided in the secondary area based on a determination that the second information items are associated with the second item types. In some implementations, the first item types are associated with the primary item type set. The second item types are not associated with the primary item type set. Operation 626 may be performed by a user interface module that is the same as or similar to user interface module 112, in accordance with one or more implementations.

In an operation 628, one or more representations of options to select or unselect a plurality of item types to modify the primary item type set may be provided on the display of the user interface simultaneously with the query input component, the representations of the determined subset, the representations of the determined sources, the primary area, and the secondary area. In some implementations, the secondary area may be removed from view of on the display of the user interface based on a determination that each of the plurality of item types is selected. Operation 628 may be performed by a user interface module that is the same as or similar to user interface module 112, in accordance with one or more implementations.

In an operation 630, one of the information items of the determined subset may be provided on a second display of the user interface. Operation 630 may be performed by a user interface module that is the same as or similar to user interface module 112, in accordance with one or more implementations.

In an operation 632, one or more suggested keywords that relate to a second query of the predefined sources and the presented information item may be determined. Operation 632 may be performed by a suggestion module that is the same as or similar to suggestion module 110, in accordance with one or more implementations.

In an operation 634, a group of suggestions relating to the suggested keywords may be provided on the second display of the user interface simultaneously with the presented information item. Operation 634 may be performed by a user interface module that is the same as or similar to user interface module 112, in accordance with one or more implementations.

Figure 7:
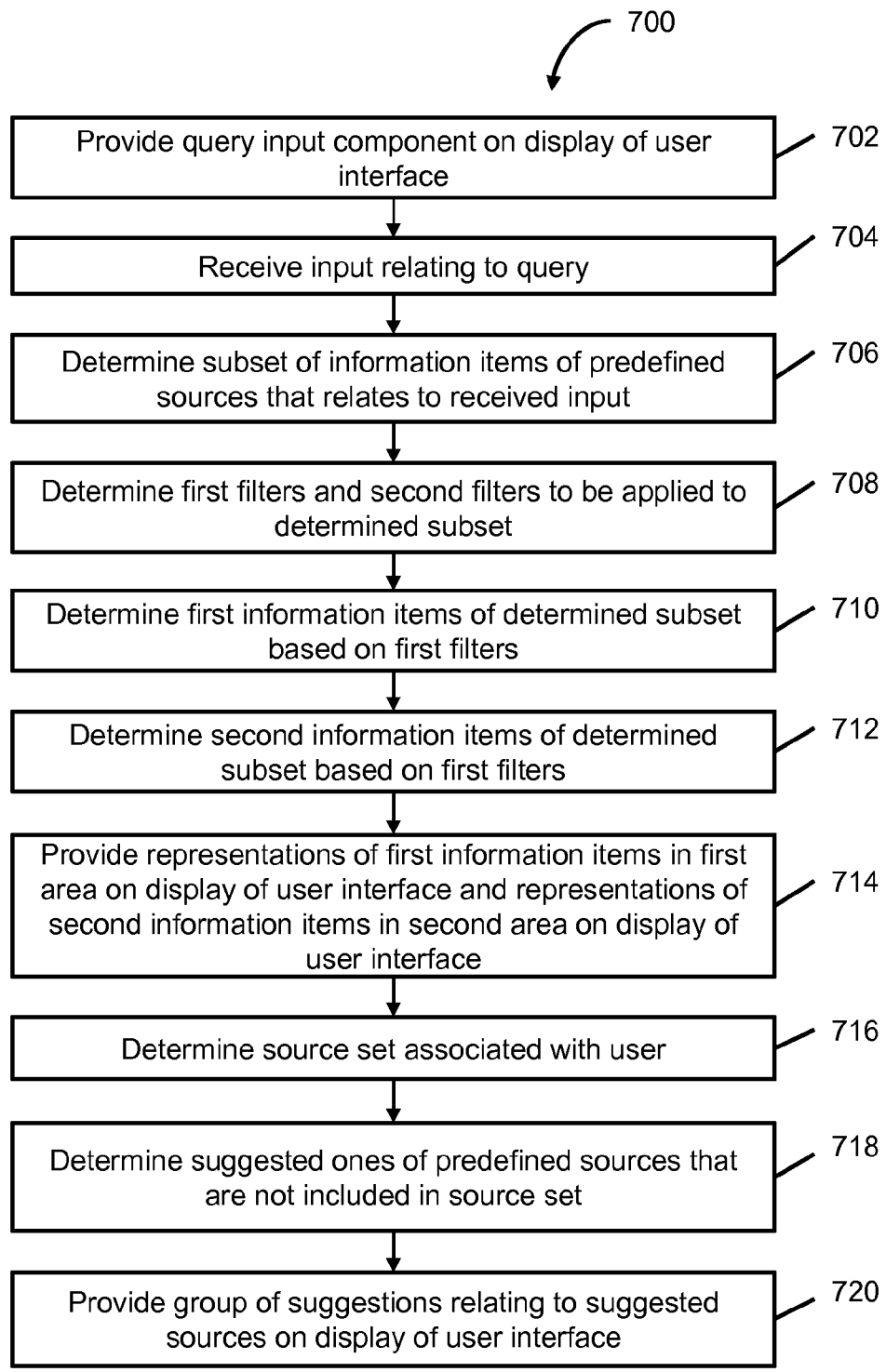
FIG. 7 illustrates a flowchart of processing operations for facilitating queries of a topic-based-source-specific search system, in accordance with one or more implementations.

FIG. 7 illustrates a flowchart of processing operations for facilitating queries of a topic-based-source-specific search system, in accordance with one or more implementations. The operations of process 700 presented below are intended to be illustrative. In some implementations, process 700 may be accomplished with one or more additional operations not described, and/or without one or more of the operations discussed. Additionally, the order in which the operations of process 700 are illustrated in FIG. 7 and described below is not intended to be limiting.

In certain implementations, one or more operations of process 700 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 700 in response to instructions stored electronically on an electronic storage medium. The one or more processing devices may include one or more devices configured through hardware, firmware, and/or software to be specifically designed for execution of one or more of the operations of process 700.

In certain implementations, the topic-based-source-system may be configured to collect information from predefined sources relating to a content topic prior to queries of the topic-based-source-system. In some implementations, the content topic may correspond to government information or other type of information.

In an operation 702, a query input component may be provided on a display of a user interface. The query input component may be configured to receive input. Operation 702 may be performed by a user interface module that is the same as or similar to user interface module 112, in accordance with one or more implementations.

In an operation 704, an input relating to a query may be received. Operation 704 may be performed by a query input module that is the same as or similar to query input module 108, in accordance with one or more implementations.

In an operation 706, a subset of information items of the predefined sources that relates to the received input may be determined. In certain implementations, the information items may relate to one or more of press releases, speeches, opinions, statements, legislations, or other government information. Operation 706 may be performed by an information retrieval module that is the same as or similar to information retrieval module 114, in accordance with one or more implementations.

In an operation 708, one or more first filters and one or more second filters to be applied to the determined subset of the information items may be determined. Operation 708 may be performed by an information retrieval module that is the same as or similar to information retrieval module 114, in accordance with one or more implementations.

In an operation 710, one or more first information items of the determined subset may be determined based on the first filters. In some implementations, the first filters may relate to one or more of first political entities, first government entities, or first legislations. Operation 710 may be performed by an information retrieval module that is the same as or similar to information retrieval module 114, in accordance with one or more implementations.

In an operation 712, one or more second information items of the determined subset may be determined based on the second filters. In some implementations, the second filters may relate to one or more of second political entities, second government entities, or second legislations. Operation 712 may be performed by an information retrieval module that is the same as or similar to information retrieval module 114, in accordance with one or more implementations.

In an operation 714, one or more representations of the first information items of the determined subset may be provided in a first area on the display of the user interface, and one or more representations of the second information items of the determined subset may be provided in a second area of the display of the user interface. The representations of the first information items and the representations of the second information items may be presented on the display simultaneously with the query input component. Operation 714 may be performed by a user interface module that is the same as or similar to user interface module 112, in accordance with one or more implementations.

In an operation 716, a source set associated with a user may be determined. The source set may include at least one source associated with the user. Operation 716 may be performed by a user profile module that is the same as or similar to user profile module 118, in accordance with one or more implementations.

In an operation 718, suggested ones of the predefined sources that are not included in the source set may be determined. Operation 718 may be performed by a suggestion module that is the same as or similar to suggestion module 110, in accordance with one or more implementations.

In an operation 720, a group of suggestions relating to the suggested sources may be provided on the display of the user interface simultaneously with the query input component, the representations of the first information items, the representations of the second information items. In some implementations, the group of suggestions relating to the suggested sources may be provided on the display of the user interface based on a determination that the suggested sources are not included in the source set. Operation 720 may be performed by a user interface module that is the same as or similar to user interface module 112, in accordance with one or more implementations.

FIG. 8 illustrates a flowchart of processing operations for facilitating comparisons of predefined source attributes based on queries of a topic-based-source-specific search system, in accordance with one or more implementations. The operations of process 800 presented below are intended to be illustrative. In some implementations, process 800 may be accomplished with one or more additional operations not described, and/or without one or more of the operations discussed. Additionally, the order in which the operations of process 800 are illustrated in FIG. 8 and described below is not intended to be limiting.

In certain implementations, one or more operations of process 800 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of process 800 in response to instructions stored electronically on an electronic storage medium. The one or more processing devices may include one or more devices configured through hardware, firmware, and/or software to be specifically designed for execution of one or more of the operations of process 800.

In certain implementations, the topic-based-source-system may be configured to collect information from predefined sources relating to a content topic prior to queries of the topic-based-source-system. In some implementations, the content topic may correspond to government information or other type of information.

In an operation 802, metadata may be stored in association with the predefined sources or information items of the predefined sources. The metadata may indicate a first attribute relating to first ones of the predefined sources or the information items, a second attribute relating to second ones of the predefined sources or the information items, or other attribute. In various implementations, the first attribute may correspond to a first political or government entity. The second attribute may correspond to a second political or government entity. In some implementations, the first political or government entity may correspond to a first political party, a first political or government organization, a first political or government figure, or other political or government entity. The second political or government entity may correspond to a second political party, a second political or government organization, a second political or government figure, or other political or government entity. Operation 802 may be performed by an indexing module that is the same as or similar to indexing module 116, in accordance with one or more implementations.

In an operation 804, a query input component may be provided on a display of a user interface. The query input component may be configured to receive input. Operation 804 may be performed by a user interface module that is the same as or similar to user interface module 112, in accordance with one or more implementations.

In an operation 806, an input relating to a query may be received. Operation 806 may be performed by a query input module that is the same as or similar to query input module 108, in accordance with one or more implementations.

In an operation 808, a subset of information items of the predefined sources that relate to the received input may be determined. Operation 808 may be performed by an information retrieval module that is the same as or similar to information retrieval module 114, in accordance with one or more implementations.

In an operation 810, a comparison between the first attribute indicated by the stored metadata and the second attribute indicated by the stored metadata may be generated based on the determined subset. In certain implementations, the comparison may be generated based on one or more first information items of the determined subset that relate to the first attribute and one or more second information items of the determined subset that relate to the second attribute. In some implementations, the comparison may be generated based on one or more first sources of the predefined sources associated with the determined subset that relate to the first attribute and one or more second sources of the predefined sources associated with the determined subset that relate to the second attribute. Operation 810 may be performed by a comparison module that is the same as or similar to comparison module 120, in accordance with one or more implementations.

In an operation 812, the generated comparison and representations of the determined subset of the information items may be provided on the display of the user interface simultaneously with the query input component. Operation 812 may be performed by a user interface module that is the same as or similar to user interface module 112, in accordance with one or more implementations.

In an operation 814, a second input relating to a second query of a plurality of attributes may be received. Operation 814 may be performed by a query input module that is the same as or similar to query input module 108, in accordance with one or more implementations.

In an operation 816, suggested ones of the plurality of attributes may be determined based on the received second input. Operation 816 may be performed by a suggestion module that is the same as or similar to suggestion module 110, in accordance with one or more implementations.

In an operation 818, a group of suggested relating to the suggested attributes may be provided on the display of the user interface simultaneously with the query input component, the generated comparison, and the representations of the determined subset of the information items. Operation 818 may be performed by a user interface module that is the same as or similar to user interface module 112, in accordance with one or more implementations.

Although the present invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any implementation can be combined with one or more features of any other implementation.

What is claimed is:

1. A computer-implemented method of facilitating queries of a topic-based-source-specific search system, the system being configured to collect information from predefined sources relating to a content topic prior to the queries, the method being implemented by the system that includes one or more processors executing one or more computer program modules which, when executed, perform the method, the method comprising:

receiving, by a query input module, an input relating to a query;

determining, by a suggestion module, suggested ones of the predefined sources and suggested ones of information items of the predefined sources based on the received input; and providing, by a user interface module, a set of suggestions including a group of suggestions relating to the suggested sources and a group of suggestions relating to the suggested information items for presentation on a user interface;

providing, by the user interface module, a query input component on a display of the user interface, wherein the query input component is configured to receive the input;

receiving, by the query input module, a second input relating to the query responsive to providing the set of suggestions; and determining, by an information retrieval module, a subset of the information items that relates to the received second input;

determining, by the information retrieval module, one or more sources associated with the determined subset of the information items; and providing, by the user interface module, one or more representations of the determined subset of the information items and one or more representations of the determined sources on the display of the user interface simultaneously with the query input component.

2. The method of claim 1, wherein the content topic corresponds to government information, and wherein the suggested information items relate to one or more of bills or laws.

3. The method of claim 1, wherein the suggested sources are determined based a determination that one or more identifiers of the suggested sources correspond to the received input.

4. The method of claim 1, further comprising:
determining, by the suggestion module, one or more suggested keywords based on the received input; and
providing, by the user interface module, a group of suggestions relating to the suggested keywords for presentation on the user interface simultaneously with the group of suggestions relating to the suggested sources and the group of suggestions relating to the suggested information items.

5. The method of claim 1, wherein the content topic corresponds to government information, and wherein the information items relate to one or more of press releases, speeches, opinions, statements, or legislation.

6. The method of claim 1, further comprising:
storing, by an indexing module, metadata in association with the predefined sources or the information items, wherein the metadata indicate a first attribute relating to first ones of the predefined sources or the information items, and a second attribute relating to second ones of the predefined sources or the information items;
receiving, by the query input module, a second input relating to the query responsive to providing the set of suggestions; and
providing, by the user interface, a presentation of a comparison between the first attribute and the second attribute based on the received second input.

7. The method of claim 6, wherein the first attribute corresponds to a first political or government entity, and wherein the second attribute corresponds to a second political or government entity.

8. The method of claim 7, wherein the first political or government entity corresponds to a first political party, a first political or government organization, or a first political or government figure, and wherein the second political or government entity corresponds to a second political party, a second political or government organization, or a political or government figure.

9. The method of claim 6, further comprising:
providing, by the user interface module, a query input component on a display of the user interface simultaneously with the presentation of the comparison, wherein the query input component is configured to receive input.

10. The method of claim 1, further comprising:
determining, by a user profile module, a source set associated with the user, wherein the source set includes at least one source associated with the user; and
providing, by the user interface module, one or more representations of options to modify the source set on the display of the user interface simultaneously with the query input component, the representations of the determined subset, and the representations of the determined sources.

11. The method of claim 10, further comprising:
determining, by the user profile module, that the source set includes a first source of the determined sources; and
determining, by the user profile module, that the source set does not include a second source of the determined sources,
wherein the representations of the modify options includes a representation of an option to remove the first source from the source set based on the determination that the source set includes the first source and a representation of an option to add the second source to the source set based on the determination that the source set does not include the second source.

12. The method of claim 1, further comprising:
associating, by a user profile module, one or more first item types with a primary item type set based on one or more inputs corresponding to selection of the first item types;
providing, by the user interface module, one or more representations of first information items of the determined subset in a primary area on the display of the user interface based on a determination that the first information items are associated with the first item types; and
providing, by the user interface module, one or more representations of second information items of the determined subset in a secondary area on the display of the user interface based on a determination that the second information items are associated with one or more second item types, wherein the primary area and the secondary area are provided on the display of the user interface simultaneously with the query input component and the determined sources.

13. The method of claim 12, further comprising:
providing, by the user interface module, one or more representations of options to select or unselect a plurality of item types to modify the primary item type set on the display of the user interface simultaneously with the query input component, the representations of the determined sources, the primary area, and the secondary area, wherein providing of the representations of the first information items in the primary area and the representations of the second information items in the secondary area is based on one or more inputs corresponding to selecting the first item types of the plurality of item types or unselecting the second item types of the plurality of item types.

14. The method of claim 12, wherein the secondary area is removed from view on the display of the user interface based on a determination that each of the plurality of item types is selected.

15. The method of claim 1, further comprising:
providing, by the user interface module, one of the information items of the determined subset on a second display of the user interface;
determining, by the suggestion module, suggested keywords that relate to a second query and the presented information item; and
providing, by the user interface module, a group of suggestions relating to the suggested keywords on the second display of the user interface simultaneously with the presented information item.

16. The method of claim 1, further comprising:
determining, by a user profile module, a source set associated with a user, wherein the source set includes at least one source associated with the user;

determining, by the suggestion module, second suggested ones of the predefined sources that are not included in the source set; and providing, by the user interface module, a group of suggestions relating to the suggested sources on the display of the user interface simultaneously with the query input component, the representations of the determined subset, and the representations of the determined sources based on a determination that the second suggested sources are not included in the source set.

17. The method of claim 1, further comprising:

determine, by the information retrieval module, one or more first information items of the determined subset based on one or more first filters;

determine, by the information retrieval module, one or more second information items of the determined subset based on one or more second filters; and providing, by the user interface module, one or more representations of the first information items in a first area on the display of the user interface and one or more representations of the second information items in a second area on the display of the user interface, wherein the first area and the second area are provided on the display of the user interface simultaneously with the query input component and the determined sources.

18. The method of claim 17, wherein the first filters relate to one or more of first political entities, first government entities, or first legislations, and wherein the second filters relate to one or more of second political entities, second government entities, or second legislations.

19. A computer-implemented method of facilitating comparisons of information item attributes based on queries of a topic-based-source-specific search system, the system being configured to collect information from predefined sources relating to a content topic prior to the queries, the method being implemented by the system that includes one or more processors executing one or more computer program modules which, when executed, perform the method, the method comprising:

storing, by an indexing module, metadata in association with information items of the predefined sources, wherein the metadata indicate a first attribute relating to first ones of the information items and a second attribute relating to second ones of the information items;

receiving, by a query input module, an input relating to a query; and determining, by an information retrieval module, a subset of the information items that relates to the received input;

providing, by a user interface module, a display of a user interface that presents a comparison between the first attribute and the second attribute based on one or more first information items of the determined subset that relate to the first attribute and one or more second information items of the determined subset that relate to the second attribute;

determining, by a suggestion module, suggested ones of the predefined sources and suggested ones of the information items of the predefined sources based on the received input;

providing, by the user interface module, a set of suggestions including a group of suggestions relating to the suggested sources and a group of suggestions relating to the suggested information items for presentation on the user interface;

providing, by the user interface module, a query input component on the display of the user interface, wherein the query input component is configured to receive the input;

receiving, by the query input module, a second input relating to the query responsive to providing the set of suggestions; and determining, by an information retrieval module, a subset of the information items that relates to the received second input;

determining, by the information retrieval module, one or more sources associated with the determined subset of the information items; and providing, by the user interface module, one or more representations of the determined subset of the information items and one or more representations of the determined sources on the display of the user interface simultaneously with the query input component.

20. The method of claim 19, wherein the first attribute corresponds to a first political or government entity, and wherein the second attribute corresponds to a second political or government entity.

21. The method of claim 20, wherein the first political or government entity corresponds to a first political party, a first political or government organization, or a first political or government figure, and wherein the second political or government entity corresponds to a second political party, a second political or government organization, or a second political or government figure.

22. The method of claim 19, further comprising:

providing, by the user interface module, one or more representations of the determined subset of the information items on the display of the user interface simultaneously with the presentation of the comparison.

23. A computer-implemented method of facilitating comparisons of predefined source attributes based on queries of a topic-based-source-specific search system, the system being configured to collect information from predefined sources relating to a content topic prior to the queries, the method being implemented by the system that includes one or more processors executing one or more computer program modules which, when executed, perform the method, the method comprising:

storing, by an indexing module, metadata in association with the predefined sources, wherein the metadata indicate a first attribute relating to first ones of the predefined sources and a second attribute relating to second ones of the predefined sources;

receiving, by a query input module, an input relating to a query;

determining, by an information retrieval module, a subset of information items of the predefined sources that relates to the received input;

providing, by a user interface module, a display of a user interface that presents a comparison between the first attribute and the second attribute based on one or more first sources of the predefined sources associated with the determined subset that relate to the first attribute and one or more second sources of the predefined sources associated with the determined subset that relate to the second attribute;

determining, by a suggestion module, suggested ones of the predefined sources and suggested ones of the information items of the predefined sources based on the received input;

providing, by the user interface module, a set of suggestions including a group of suggestions relating to the suggested sources and a group of suggestions relating to the suggested information items for presentation on the user interface;

providing, by the user interface module, a query input component on the display of the user interface, wherein the query input component is configured to receive the input;

receiving, by the query input module, a second input relating to the query responsive to providing the set of suggestions; and determining, by the information retrieval module, a subset of the information items that relates to the received second input;

determining, by the information retrieval module, one or more sources associated with the determined subset of the information items; and providing, by the user interface module, one or more representations of the determined subset of the information items and one or more representations of the determined sources on the display of the user interface simultaneously with the query input component.

24. The method of claim 23, wherein the first attribute corresponds to a first political party, a first political or government organization, or a first political or government figure, and wherein the second attribute corresponds to a second political party, a second political or government organization, or a second political or government figure, the method further comprising:

providing, by the user interface module, one or more representations of the determined subset of the information items on the display of the user interface simultaneously with the presentation of the comparison.

25. A topic-based-source-specific search system for facilitating queries of the system, the system being configured to collect information from predefined sources relating to a content topic prior to the queries, the system comprising:

one or more physical processors configured to execute computer program modules, the computer program modules comprising:

an query input module configured to receive an input relating to a query;

a suggestion module configured to determine suggested ones of the predefined sources and suggested ones of information items of the predefined sources based on the received input; and a user interface module configured to provide a set of suggestions including a group of suggestions relating to the suggested sources and a group of suggestions relating to the suggested information items for presentation on a user interface, provide a query input component on a display of the user interface, wherein the query input component is configured to receive the input;

wherein the query input module is further configured to receive a second input relating to the query responsive to providing the set of suggestions; and an information retrieval module configured to determine a subset of the information items that relates to the received second input, and determine one or more sources associated with the determined subset of the information items;

wherein the user interface module is further configured to provide one or more representations of the determined subset of the information items and one or more representations of the determined sources on the display of the user interface simultaneously with the query input component.

* * * * *